United States Patent
Mori et al.

(10) Patent No.: US 8,339,528 B2
(45) Date of Patent: Dec. 25, 2012

(54) ERASING DEVICE AND METHOD OF DISPLAY MEDIUM, AND ERASING SIGNAL SETTING METHOD

(75) Inventors: Kenichi Mori, Kanagawa (JP); Tetsushi Satou, Kanagawa (JP); Koji Shigemura, Kanagawa (JP); Setsuo Kaneko, Kanagawa (JP)

(73) Assignee: NLT Technologies, Ltd., Kanagawa (JP)

( * ) Notice: Subject to any disclaimer, the term of this patent is extended or adjusted under 35 U.S.C. 154(b) by 248 days.

(21) Appl. No.: 12/907,503

(22) Filed: Oct. 19, 2010

(65) Prior Publication Data

US 2011/0090412 A1   Apr. 21, 2011

(30) Foreign Application Priority Data

Oct. 20, 2009  (JP) ................. 2009-241894

(51) Int. Cl.
 *G02F 1/1335* (2006.01)
 *G02F 1/133* (2006.01)
 *G02F 1/1347* (2006.01)
 *C09K 19/02* (2006.01)
(52) U.S. Cl. ............... 349/12; 349/73; 349/74; 349/175
(58) Field of Classification Search ............ 349/12, 349/73, 74, 175
See application file for complete search history.

(56) References Cited

U.S. PATENT DOCUMENTS

| | | | |
|---|---|---|---|
| 6,888,522 B1* | 5/2005 | Shibata et al. ........... | 345/87 |
| 7,570,310 B2* | 8/2009 | Harada et al. ........... | 349/25 |
| 7,961,261 B2* | 6/2011 | Ishii et al. ........... | 349/25 |
| 2010/0002155 A1* | 1/2010 | Yamaguchi et al. ...... | 349/12 |

FOREIGN PATENT DOCUMENTS

| | | |
|---|---|---|
| JP | 11-237644 A | 8/1999 |
| JP | 11-326871 A | 11/1999 |
| JP | 2001-201762 A | 7/2001 |
| JP | 2003-186052 A | 7/2003 |
| JP | 2006-039107 A | 2/2006 |
| JP | 2006-039833 A | 2/2006 |

* cited by examiner

*Primary Examiner* — Mike Qi
(74) *Attorney, Agent, or Firm* — Sughrue Mion, PLLC

(57) ABSTRACT

To provide an erasing device whose power consumption required for erasing operations is suppressed, which does not spoil the portability of an optical writing type display medium. In a first display function layer, voltages applied to two cholesteric liquid crystal layers when an erasing voltage is applied between a pair of electrodes are defined as V1, V2, respectively, and threshold voltages with which the cholesteric liquid crystal layers change to the homeotropic alignment are defined as Vth1, Vth2, respectively. In that case, in a state the voltages V1 and V2 are determined according to only each resistance of the cholesteric liquid crystal layers and resistance of a photoconductive layer, i.e., a sufficient time has passed from a point at which the erasing voltage is applied, V1≧Vth1 and V2≧Vth2 apply.

20 Claims, 17 Drawing Sheets

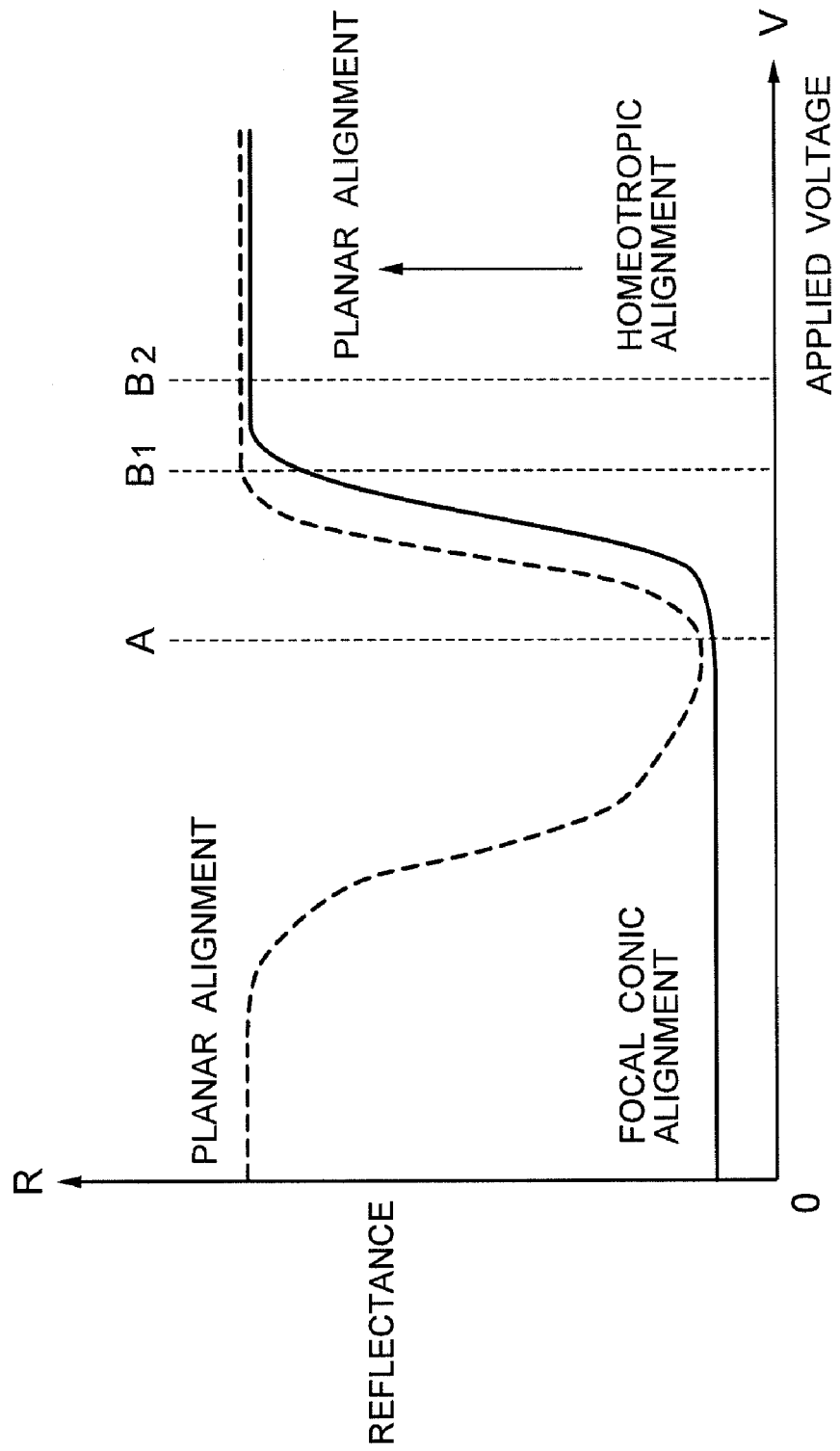

006-039107 (Patent Document 2)). This clip functions as an eras-

ERASING DEVICE AND METHOD OF DISPLAY MEDIUM, AND ERASING SIGNAL SETTING METHOD

CROSS-REFERENCE TO RELATED APPLICATION

This application is based upon and claims the benefit of priority from Japanese patent application No. 2009-241894, filed on Oct. 20, 2009, the disclosure of which is incorporated herein in its entirety by reference.

BACKGROUND OF THE INVENTION

1. Field of the Invention

The present invention relates to an erasing device and the like of an image pattern recorded on a display medium. More specifically, the present invention relates to an erasing device and the like for erasing an image pattern recorded on an optical writing type display medium that uses a cholesteric liquid crystal layer and a photoconductive layer.

2. Description of the Related Art

Among rewritable display media of super low power consumption capable of keeping displays with no power supply, the display medium using the cholesteric liquid crystal can display color images without using color filters. Therefore, developments of such display medium have been actively conducted.

The cholesteric liquid crystal employs a layer structure in which molecules are arranged in layers of a pseudo manner, which is a spiral structure where the major axes of liquid crystal molecules are arranged in parallel in each layer, and the alignment directions thereof are rotated by each layer. The cholesteric liquid crystal has a selective reflection characteristic which reflects the wavelength corresponding to the spiral pitch among light making incident in parallel to the spiral axis and transmits the remaining light. The wavelength of the reflection light can be controlled through adjusting the spiral pitch. Thus, it is possible to achieve a display medium capable of providing a full-color display by laminating cholesteric liquid crystals, each of which selectively reflects the light of three colors such as red, green, and blue, for example.

The cholesteric liquid crystal has three kinds of alignments, i.e., the planar alignment, the focal conic alignment, and the homeotropic alignment. With the planar alignment, the spiral axis is almost in parallel with respect to the incident light, and reflects the light that corresponds to the spiral pitch. With the focal conic alignment, the spiral axis is almost perpendicular with respect to the incident light, and the selective reflection characteristic is lost so that incident light is transmitted therethrough. With the homeotropic alignment, the spiral structure is broken, so that the selective reflection characteristic is lost. Therefore, the incident light is transmitted therethrough. Those three kinds of alignments are switched by applying voltages to the cholesteric liquid crystals. The planar alignment and the focal conic alignment keep the states thereof without applying voltages. Thus, image patterns can be kept without a power supply through settling a region of the planar alignment and a region of the focal conic alignment according to the image pattern.

As a method for writing the image pattern on the display medium using the cholesteric liquid crystal, an optical writing type driving device is disclosed (Japanese Unexamined Patent Publication Hei 11-237644 (Patent Document 1), for example). This display medium is in a structure in which a cholesteric liquid crystal layer and a photoconductive layer are laminated, and those are sandwiched by a pair of electrodes. This display medium is loaded on the writing device, and light according to the image pattern is irradiated from an exposure device within the writing device. At the same time, a signal is inputted to the display medium from the writing device, and a voltage is applied between the electrodes by that signal. The resistance of the photoconductive layer in the region where the light is irradiated becomes reduced, so that a divided voltage applied to the cholesteric liquid crystal layer becomes increased. Inversely, there is no change in the resistance of the photoconductive layer in the region where the light is not irradiated, so that the divided voltage applied to the cholesteric liquid crystal layer becomes relatively small. As described, there is generated a difference in the voltage applied to the cholesteric liquid crystal layer in accordance with the brightness of the light, and the alignment in the cholesteric liquid crystal layer changes thereby. This makes it possible to write the image pattern. Even if the display medium is detached from the writing device, the image pattern can be held. Thus, it is possible to take out only the display medium and view the image pattern. That is, as in cases of paper media, it is possible to achieve a portable and rewritable display medium.

There is considered a case where an image pattern is written to an optical writing type display medium, which is taken out and the image thereon is viewed, and the image pattern needs to be erased thereafter for preventing information leakage. However, the display medium itself does not have a writing function. Thus, when there is no writing device, it is not possible to overwrite and erase the image pattern. A surface emission type display such as an LCD (Liquid Crystal Display) that creates optical image patterns are most frequently used for the exposure device, and to carry the writing device including the exposure device in case for erasing the image patterns results in losing the portability of the display medium that is an original characteristic of the display medium.

As an image pattern erasing module that does not require a writing device including an exposure device, there is disclosed a display medium that includes a clip having an erasing function (Japanese Unexamined Patent Publication 2006-039107 (Patent Document 2)). This clip functions as an erasing device of the display medium. That is, in response to an action of pulling out the clip from the display medium, an erasing voltage is applied from an erasing power supply provided to the clip, and an image pattern recorded on the display medium is erased. Only thing required for erasure is the clip, so that the portability of the display medium can be maintained.

Further, Japanese Unexamined Patent Publication 2001-201762 (Patent Document 3) discloses an optical writing type display medium having a specific display function layer. This display function layer is a structure in which a laminate including a photoconductive layer and a cholesteric liquid crystal layer constituted with a plurality of layers is sandwiched between a pair of electrodes.

Japanese Unexamined Patent Publication 2003-186052 (Patent Document 4) discloses an electronic display medium on which image information is recorded by impression a voltage and irradiation of light (see paragraph 0009). This electronic display medium is formed by laminating a liquid crystal layer constituted with a cholesteric liquid crystal and the like and a photoconductive layer whose resistance value is changed by absorption of light (see paragraph 0017). Further, voltage value Va applied to the liquid crystal layer can be expressed by a following expression, provided that a static capacitance value of the liquid crystal layer is Ca, a static capacitance value of the photoconductive layer is Cb, a resistance value of the liquid crystal layer is Ra, the resistance value of the photoconductive layer is Rb, and a voltage value applied to the liquid crystal layer and the photoconductive layer is V (see paragraphs 0019, 0020).

$$Va = V \times Ca/C = V/(1+Rb/Ra), \text{ where}$$

$$C = CaCb/(Ca+Cb)$$

Japanese Unexamined Patent Publication 2006-039833 (Patent Document 5) discloses an optical writing type electronic paper (see paragraph 0032). In this electronic paper, a clip is attached to a display unit in a detachable manner. The clip includes a terminal connected to electrodes of the display unit, a radio communication unit, a memory, a processor, a battery, and the like, and functions as a processing unit.

Japanese Unexamined Patent Publication Hei 11-326871 (Patent Document 6) discloses a liquid crystal display element driving method which displays images by sandwiching a liquid crystal showing a cholesteric phase between two substrates having electrodes provided in matrix on the surfaces thereof, and changing the state of the liquid crystal with a voltage applied to the electrodes.

As in the case of the paper medium, the optical writing type display medium is used in various kinds of places. Thus, erasing operations are required to be performed regardless of the places. Therefore, the power supply provided to the clip as the erasing device disclosed in Patent Document 2 needs to be a battery such as a dry battery. In order for the erasing device to have a similar portability as that of the optical writing type display medium, the volume of the battery provided to the erasing device is preferable to be small. Further, the number of exchanging times of the battery is preferable to be small, so that it is unnecessary to carry a spare battery.

That is, the power consumed in one-time erasure is preferable to be as small as possible. However, Patent Documents 1-6 mention about nothing about that, while the power consumption can be suppressed if it is possible to set the erasing voltage applied to the display medium by the erasing device to be low.

It is therefore an exemplary object of the present invention to provide an erasing device in which the power consumption required for the erasing operation is suppressed, and with which the portability of the optical writing type display medium is not ruined.

SUMMARY OF THE INVENTION

The erasing device according to an exemplary aspect of the invention is characterized as an erasing device used for erasing an image pattern recorded on an optical writing type display medium that includes a display function layer in a structure in which a laminate including a photoconductive layer and n-layers (n is a natural number) of cholesteric liquid crystal layers is sandwiched between a pair of electrodes. The erasing device includes a signal generating section that applies an erasing voltage for erasing the image pattern to the pair of electrodes, wherein in a state where Vm is determined according to only each resistance of the n-layers of the cholesteric liquid crystal layers and resistance of the photoconductive layer, the erasing voltage is set to satisfy $Vm \geq Vthm$ in all cases where m is an integer of 1 to n, provided that m takes any integers from 1 to n, a voltage applied to the m-th layer of the cholesteric liquid crystal layer when the erasing voltage is applied between the pair of electrodes is Vm, and a threshold voltage with which the m-th layer of the cholesteric liquid crystal layer changes to an homeotropic alignment is Vthm.

The erasing method according to another exemplary aspect of the invention is characterized as an erasing method used for erasing, an image pattern recorded on an optical writing type display medium that includes a display function layer in a structure in which a laminate including a photoconductive layer and n-layers (n is a natural number) of cholesteric liquid crystal layers is sandwiched between a pair of electrodes. The erasing method includes:

in a state where Vm is determined according to only each resistance of the n-layers of the cholesteric liquid crystal layers and resistance of the photoconductive layer, setting the erasing voltage to satisfy $Vm \geq Vthm$ in all cases where m is an integer of 1 to n, provided that m takes any integers from 1 to n, a voltage applied to the m-th layer of the cholesteric liquid crystal layer when the erasing voltage is applied between the pair of electrodes is Vm, and a threshold voltage with which the m-th layer of the cholesteric liquid crystal layer changes to an homeotropic alignment is Vthm; and erasing the image pattern by applying the set erasing voltage between the pair of electrodes.

The erasing signal setting method according to still another exemplary aspect of the invention is characterized as an erasing signal setting method for setting an erasing voltage applied between a pair of electrodes for erasing an image pattern recorded on an optical writing type display medium that includes a display function layer in a structure in which a laminate including a photoconductive layer and n-layers (n is a natural number) of cholesteric liquid crystal layers is sandwiched between the pair of electrodes. The erasing signal setting method includes:

defining that m takes any integers from 1 to n, a voltage applied to the m-th layer of the cholesteric liquid crystal layer when the erasing voltage is applied between the pair of electrodes is Vm, and a threshold voltage with which the m-th layer of the cholesteric liquid crystal layer changes to an homeotropic alignment is Vthm; and in a state where Vm is determined according to only each resistance of the n-layers of the cholesteric liquid crystal layers and resistance of the photoconductive layer, setting the erasing voltage to satisfy $Vm \geq Vthm$ in all cases where m is an integer of 1 to n.

The optical medium according to still another exemplary aspect of the invention is characterized as an optical writing type display medium that includes a display function layer in a structure in which a laminate including a photoconductive layer and n-layers (n is a natural number) of cholesteric liquid crystal layers is sandwiched between the pair of electrodes, and the display medium is provided with the erasing device of the present invention.

BRIEF DESCRIPTION OF THE DRAWINGS

FIG. 5 is a graph for describing the behaviors of changes in the alignment of a cholesteric liquid crystal;

DETAILED DESCRIPTION OF THE EXEMPLARY EMBODIMENTS (First Exemplary Embodiment)

Figure 1:
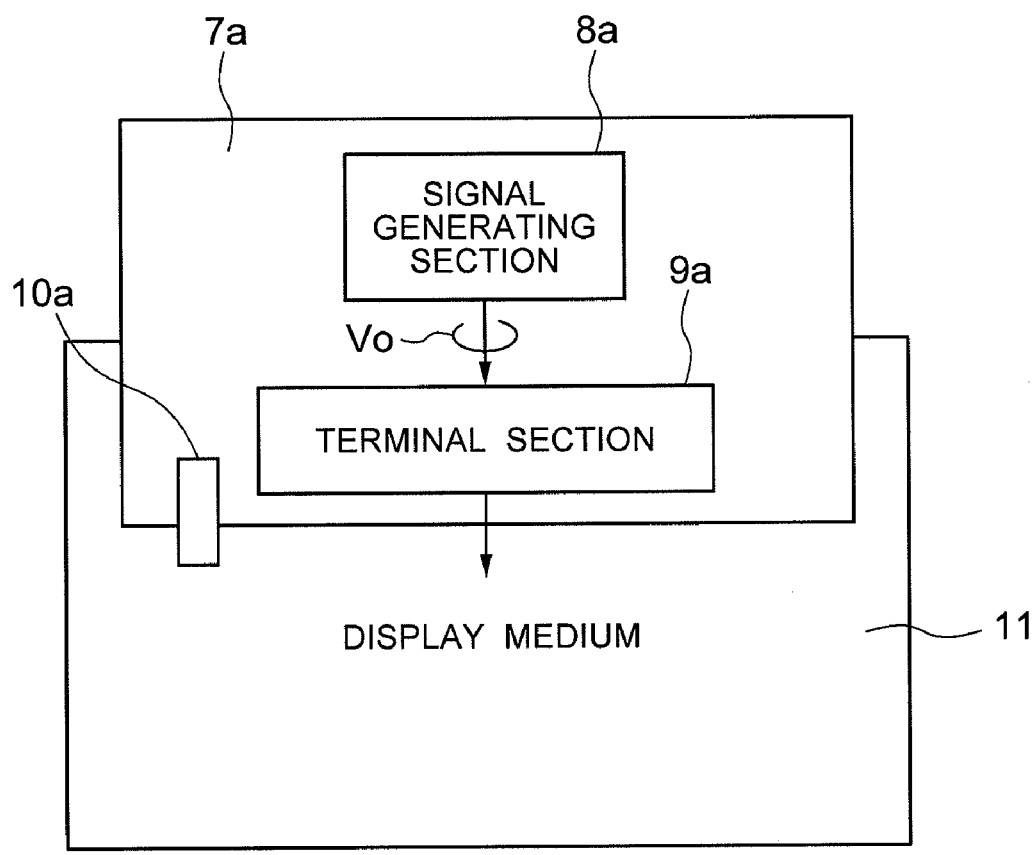
FIG. 1 is a conceptual illustration showing the structure of an erasing device according to a first exemplary embodiment.
Figure 2:
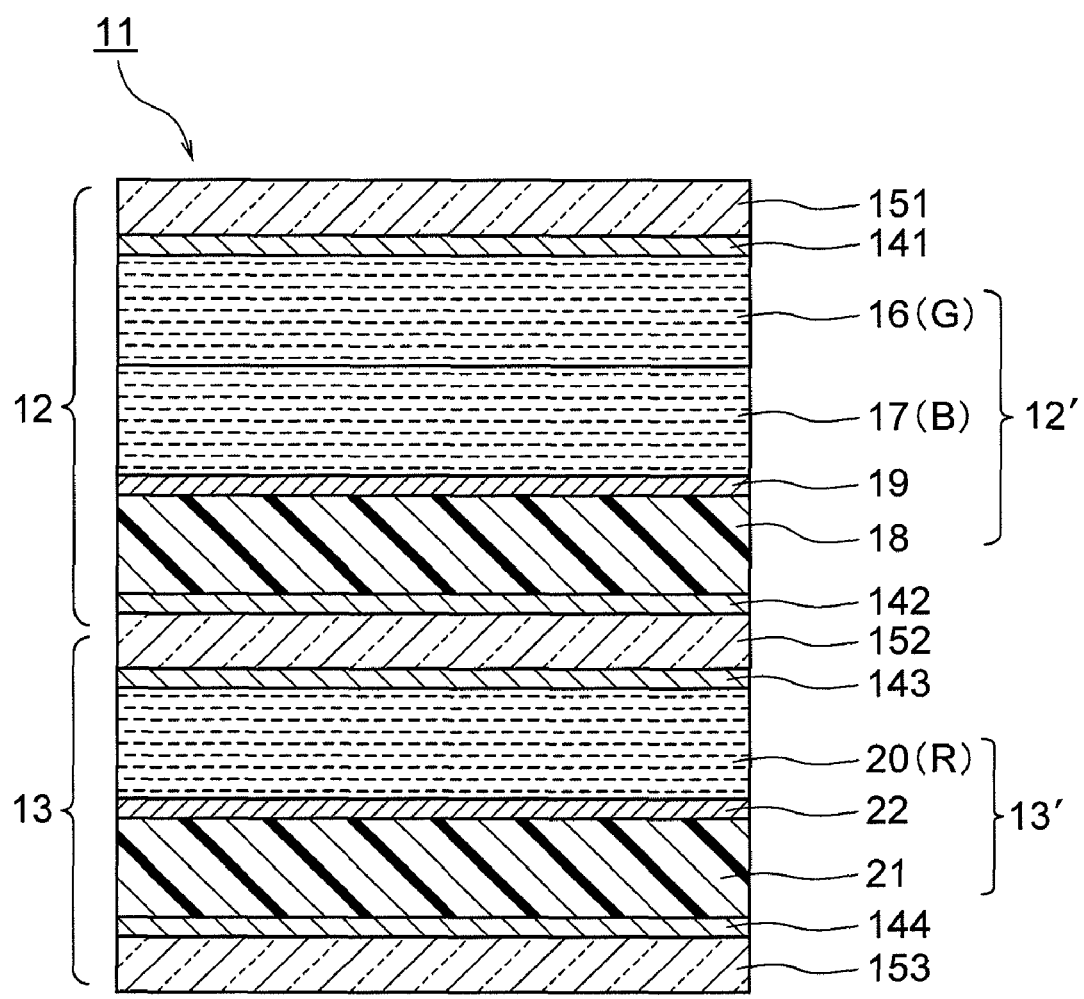
FIG. 2 is a cross-sectional view of a display medium according to the first exemplary embodiment.
Figure 3:
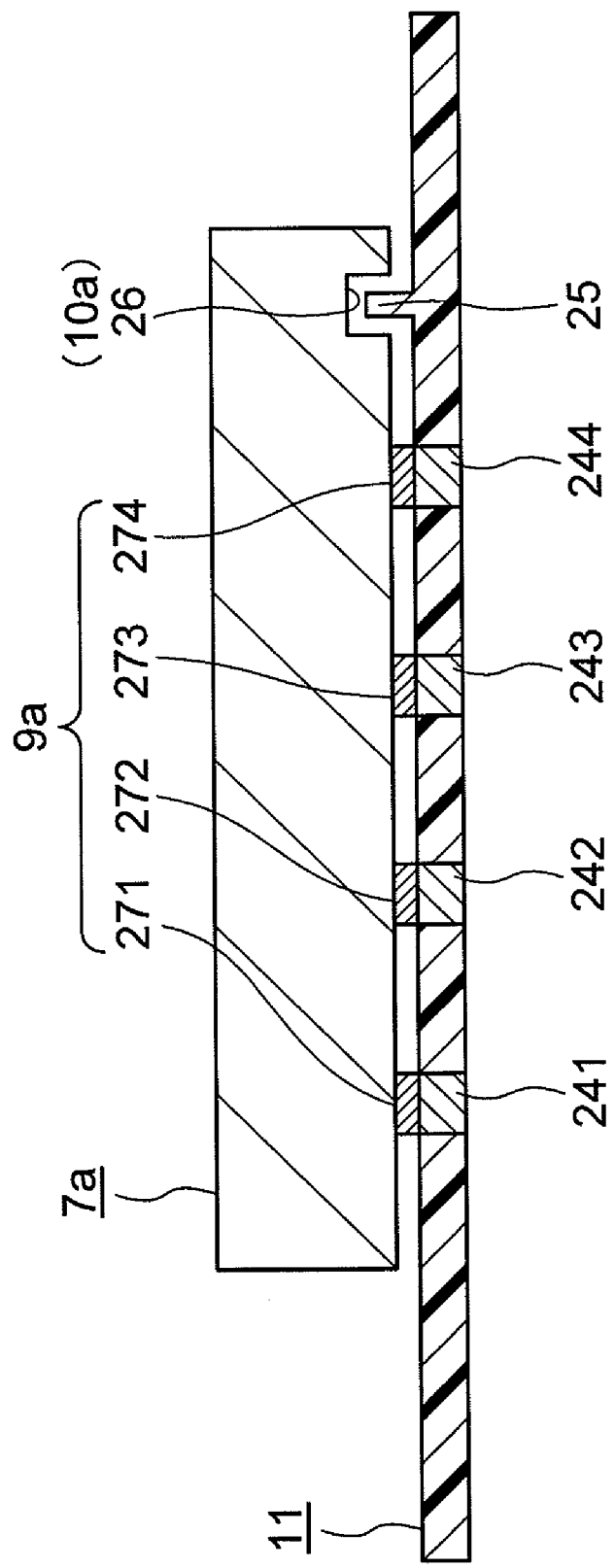
FIG. 3 is an illustration for describing fitting of the erasing device and the display medium according to the first exemplary embodiment.
Figure 4:
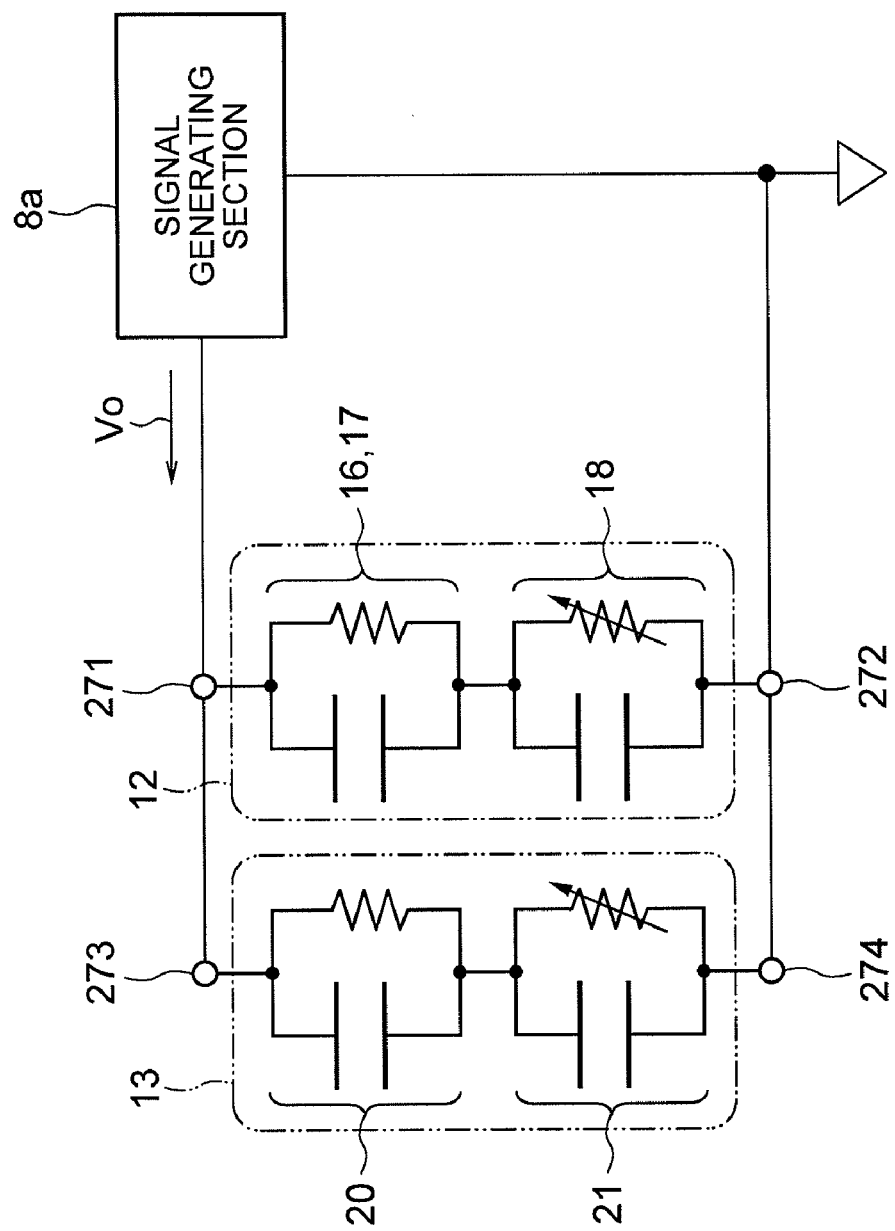
FIG. 4 is an illustration for describing the connection between a signal generating section and the display medium according to the first exemplary embodiment.

FIG. 1 is a conceptual illustration showing the structure of an erasing device according to a first exemplary embodiment. FIG. 2 is a cross-sectional view showing a display medium according to the first exemplary embodiment. FIG. 3 is an illustration for describing fitting of the erasing device and the display medium according to the first exemplary embodiment. FIG. 4 is an illustration for describing connection between a signal generating section and the display medium according to the first exemplary embodiment. Hereinafter, explanations will be provided by referring to FIG. 1-FIG. 4.

An erasing device 7a of the first exemplary embodiment is used for an optical writing type display medium 11 to erase an image pattern recorded on the display medium 11. The display medium 11 includes a first display function layer 12 and a second display function layer 13.

The first display function layer 12 is in a structure in which a laminate 12' including a photoconductive layer 18 and cholesteric layers 16, 17 configured with two layers is sandwiched between a pair of electrodes 141, 142. The second display function 13 is in a structure in which a laminate 13' including a photoconductive layer 21 and a cholesteric liquid crystal layer 20 configured with a single layer is sandwiched between a pair of electrodes 143, 144. Further, the erasing device 7a includes a signal generating section 8a. The signal generating section 8a applies an erasing voltage $V_0$ for erasing the image pattern recorded on the display medium 11 between the pair of electrodes 141, 142 and between the pair of electrodes 143, 144, respectively. Note here that the erasing voltage $V_0$ is set to satisfy following two conditions simultaneously.

In the first display function layer 12, it is assumed that voltages applied to the cholesteric layers 16 and 17 when the erasing voltage $V_0$ is applied between the pair of electrodes 141, 142 are V1 and V2, respectively, and threshold voltages with which the cholesteric layers 16, 17 change to the homeotropic alignment are Vth1 and Vth2, respectively. At this time, it is in a state where the voltages V1 and V2 are determined according to only each resistance of the cholesteric layers 16, 17 and the resistance of the photoconductive layer 18, i.e., in a state where a sufficient time has passed after the erasing voltage $V_0$ is applied, $V1 \geqq Vth1$ and $V2 \geqq Vth2$ apply (condition 1). In the second display function layer 13, it is assumed that a voltage applied to the cholesteric liquid crystal layer 20 when the erasing voltage $V_0$ is applied between the pair of electrodes 143, 144 is V1' and a threshold voltage with which the cholesteric liquid crystal layer 20 changes to the homeotropic alignment is Vth1'. At this time, it is in a state where the voltage V1' is determined according to only the resistance of the cholesteric liquid crystal layer 20 and the resistance of the photoconductive layer 21, i.e., in a state where a sufficient time has passed after the erasing voltage $V_0$ is applied, $V1' \geqq a$ Vth1' applies (condition 2).

With the first exemplary embodiment, it is clearly defined that the voltages V1, V2 applied to the cholesteric liquid crystal layers 16, 17 are determined according to only the resistance of the cholesteric liquid crystal layers 16, 17 and the resistance of the photoconductive layer 18 when applying the erasing voltage $V_0$ to the laminate 12', and the erasing voltage $V_0$ is set in such a manner that the voltages V1, V2 surely exceed the threshold voltages Vth1, Vth2. Further, it is clearly defined that the voltage V1' applied to the cholesteric liquid crystal layer 20 is determined according to only the resistance of the cholesteric liquid crystal layer 20 and the resistance of the photoconductive layer 21 when applying the erasing voltage $V_0$ to the laminate 13', and the erasing voltage $V_0$ is set in such a manner that the voltage V1' surely exceeds the threshold voltage Vth1'. Thereby, the erasing voltage $V_0$ is made to be a minimum necessary value, so that low power consumption can be achieved. Therefore, it is possible to provide the erasing device 7a in which the power consumption required for the erasing operation is suppressed, and with which the portability of the optical writing type display medium 11 is not ruined.

For example, in a case where the resistances of each of the cholesteric liquid crystal layers 16, 17, 20 are equal, the resistances of each of the photoconductive layers 18, 21 are equal, and it is considered to satisfy $2Vth1 \geqq Vth1'$ and $2Vth2 \geqq Vth1'$, the erasing voltage $V_0$ may be set in a following manner. In that case, the erasing voltage $V_0$ is set in such a manner that a following expression (1) applies, provided that n=2, each resistance of the cholesteric liquid crystal layers 16, 17 is $R_{LC}$, the resistance of the photoconductive layer 18 is $R_{PC}$, the maximum value out of the threshold voltages Vth1 and Vth2 is $V_{thmax}$ in the first display function layer 12.

[Numerical Expression 1]

$$V_0 \geq \frac{nR_{LC} + R_{PC}}{R_{LC}} V_{thmax} \quad (1)$$

Note here that the expression (1) described above also applies in the case of the second display function layer 13, provided that n=1, the resistance of the cholesteric liquid crystal layer 20 is $R_{LC}$, the resistance of the photoconductive layer 21 is $R_{PC}$, and the threshold voltages Vth1' is $V_{thmax}$. The erasing voltage $V_0$ becomes the lowest voltage when it is equal to the right side of the expression (1).

Furthermore, the erasing voltage $V_0$ including the time for applying the erasing voltage $V_0$ may also be set as follows.

Note here that the erasing voltage $V_0$ is set to satisfy following two conditions simultaneously. In the first display function layer 12, in a state where the voltages V1 and V2 are determined according to only each static capacitance of the cholesteric liquid crystal layers 16, 17 and the static capacitance of the photoconductive layer 18 immediately after applying the erasing voltage $V_0$ between the pair of electrodes 141 and 142, and then those become close to the values that are determined according to each resistance of the cholesteric liquid crystal layers 16, 17 and the resistance of the photoconductive layer 18, V1≧Vth1 and V2≧Vth2 apply in all the time from the point at which the erasing voltage $V_0$ is applied to the point at which the cholesteric liquid crystal layers 16, 17 change to the homeotropic alignment (condition 3). In the second display function layer 13, in a state where the voltage V1' is determined according to only the static capacitance of the cholesteric liquid crystal layer 20 and the static capacitance of the photoconductive layer 21 immediately after applying the erasing voltage $V_0$ between the pair of electrodes 143 and 144, and then those become close to the values determined according to only the resistance of the cholesteric liquid crystal layer 20 and the resistance of the photoconductive layer 21, V'1≧Vth1' applies in all the time from the point at which the erasing voltage $V_0$ is applied to the point at which the cholesteric liquid crystal layer 20 changes to the homeotropic alignment (condition 4). Note here that the erasing voltage $V_0$ may be set to satisfy the conditions 1, 2 described above as well in addition to the conditions 3, 4.

That is, when the erasing voltage $V_0$ is applied to the laminate 12', it is so clearly defined that V1 and V2 applied to the cholesteric liquid crystal layers 16, 17 are determined according to only each static capacitance of the cholesteric liquid crystal layers 16, 17 and the static capacitance of the photoconductive layer 18 immediately after applying the erasing voltage $V_0$, and then those become close to the values that are determined according to only each resistance of the cholesteric liquid crystal layers 16, 17 and the resistance of the photoconductive layer 18. Further, the erasing voltage $V_0$ is set in such a manner that the voltages V1, V2 securely exceed the threshold values Vth1, Vth2 in all the time from the point at which the erasing voltage $V_0$ is applied to the point at which the cholesteric liquid crystal layers 16, 17 change to the homeotropic alignment. Furthermore, when the erasing voltage $V_0$ is applied to the laminate 13', it is so clearly defined that V1 and V2 are determined according to only the static capacitance of the cholesteric liquid crystal layer 20 and the static capacitance of the photoconductive layer 21 immediately after applying the erasing voltage $V_0$, and then those become close to the values determined according to only the resistance of the cholesteric liquid crystal layer 20 and the resistance of the photoconductive layer 21. Further, the erasing voltage $V_0$ is set in such a manner that the voltages V1' securely exceeds the threshold value Vth1' in all the time from the point at which the erasing voltage $V_0$ is applied to the point at which the cholesteric liquid crystal layer 20 changes to the homeotropic alignment. Thereby, the erasing voltage $V_0$ can be made a minimum necessary value more accurately, so that still lower power consumption can be achieved. Therefore, it is possible to provide the erasing device 7a in which the power consumption required for the erasing operation is more suppressed, and with which the portability of the optical writing type display medium 11 is not ruined.

For example, in a case where the resistances and static capacitances of each of the cholesteric liquid crystal layers 16, 17, 20 are equal to each other, the resistances and static capacitances of each of the photoconductive layers 18, 21 are equal to each other, and it is considered to satisfy 2Vth1≧Vth1' and 2Vth2≧Vth1', the erasing voltage $V_0$ may be set in a following manner. In that case, in the first display function layer 12, the erasing voltage $V_0$ is set to satisfy a following expression (2) applies, provided that n=2, each resistance of the cholesteric liquid crystal layers 16, 17 is $R_{LC}$, the resistance of the photoconductive layer 18 is $R_{PC}$, the static capacitances of each of the cholesteric liquid crystal layers 16, 17 is $C_{LC}$, the static capacitance of the photoconductive layer 18 is $C_{PC}$, the maximum value out of the threshold voltages Vth1 and Vth2 is $V_{thmax}$, the time required to be change to the homeotropic alignment is $t_H$, and the charging/discharging time constant of the first display function layer 12 is $\tau$.

[Numerical Expression 2]

$$V_0 \geq \frac{V_{thmax}}{\left(\frac{C_{PC}}{nC_{PC}+C_{LC}} - \frac{R_{LC}}{R_{PC}+nR_{LC}}\right)\exp\left(-\frac{t_H}{\tau}\right) + \frac{R_{LC}}{R_{PC}+nR_{LC}}} \quad (2)$$

Note here that the expression (2) also applies in the case of the second display function layer 13, provided that n=1, the resistance of the cholesteric liquid crystal layer 20 is $R_{LC}$, the resistance of the photoconductive layer 21 is $R_{PC}$, the static capacitance of the cholesteric liquid crystal layer 20 is $C_{LC}$, the static capacitance of the photoconductive layer 21 is $C_{PC}$, the threshold voltage Vth1' is $V_{thmax}$, the time required to change to the homeotropic alignment is $t_H$, and the charging/discharging time constant of the second display function layer 13 is $\tau$. The erasing voltage $V_0$ becomes the lowest voltage when it is equal to the right side of the expression (2). The resistances $R_{LC}$ and the static capacitances $C_{LC}$ of each of the cholesteric layers 16, 17, 20 as well as the resistances $R_{PC}$ and the static capacitances $C_{PC}$ of the photoconductive layers 18, 21 shown in the expression (1) and the expression (2) necessary for setting the erasing voltage $V_0$ are values measured by using an impedance measuring device such as an LCR meter under a measurement frequency of 100 Hz or less.

The erasing voltage $V_0$ may be set as an amplitude of an alternating current voltage. However, it is desirable to be set as that of a direct current voltage. It is because the power consumed in the wiring by the electric current flowing in a static capacitance component can be decreased in a case of the direct current voltage. Further, the erasing device 7a may further include a fitting section 10a for being mechanically mounted to the display medium 11, and a terminal section 9a for being electrically connected to the display medium 11. In this case, mount and dismount of the erasing device 7a to/from the display medium 11 can be done easily, thereby making it possible to improve the convenience. Further, the display medium 11 of the first exemplary embodiment includes the erasing device 7a of the first exemplary embodiment, so that it is possible to lower the power consumption.

While the cases of n=1 and n=2 are described in the first exemplary embodiment as a way of example, there is no limit set in the value of "n". For example, it is also possible to define that the erasing voltage is set in such a manner that Vm≧Vthm applies in all the cases where m takes values of 1 to n in a state where Vm is determined according to only the resistances of the cholesteric liquid crystal layers formed with n-pieces of layers and the resistance of the photoconductive layer, provided that m takes an integer from 1 to n, the voltage applied to the m-th layer of the cholesteric liquid crystal layer when the erasing voltage is applied between a pair of electrodes is Vm, and the threshold voltage with which the m-th layer of the cholesteric liquid crystal layer changes to the homeotropic alignment is Vthm, Similarly, it may also be defined that the erasing voltage is set in such a manner that Vm≧Vthm applies in all the time from the point at which the erasing voltage is applied to the point at which the m-th layer of the cholesteric liquid crystal layer changes to the homeotropic alignment and in all the cases where m takes values of 1 to n in a state where Vm is determined according to only the static capacitances of the cholesteric liquid crystal layers formed with n-pieces of layers and the static capacitance of the photoconductive layer immediately after applying the erasing voltage to a pair of the electrodes, and then Vm becomes close to the value that are determined according to only the resistances of each of the cholesteric liquid crystal layers formed with n-pieces of layers and the resistance of the photoconductive layer.

Next, an erasing method according to the first exemplary embodiment will be described.

The erasing method according to the first exemplary embodiment is an invention of a method acquired by putting the operations of the erasing device 7a of the first exemplary embodiment into a form of a method. That is, the erasing method of the first exemplary embodiment is a method for erasing an image pattern recorded on the optical writing type display medium 11 that includes the first display function layer 12 and the second display function layer 13. First, the erasing voltage $V_0$ is set to satisfy the following two conditions simultaneously. In the first display function layer 12, it is assumed that voltages applied to the cholesteric layers 16 and 17 when the erasing voltage $V_0$ is applied between the pair of electrodes 141, 142 are V1 and V2, respectively, and threshold values with which the cholesteric layers 16, 17 change to the homeotropic alignment are Vth1 and Vth2, respectively. At this time, it is in a state where the voltages V1 and V2 are determined according to only each resistance of the cholesteric layers 16, 17 and the resistance of the photoconductive layer 18, i.e., in a state where a sufficient time has passed after the erasing voltage $V_0$ is applied, V1≧Vth1 and V2≧Vth2 apply (condition 1). In the second display function layer 13, it is assumed that a voltage applied to the cholesteric liquid crystal layer 20 when the erasing voltage $V_0$ is applied between the pair of electrodes 143, 144 is V1' and a threshold voltage with which the cholesteric liquid crystal layer 20 change to the homeotropic alignment is Vth1'. At this time, it is in a state where the voltage V1' is determined according to only the resistance of the cholesteric liquid crystal layer 20 and the resistance of the photoconductive layer 21, i.e., in a state where a sufficient time has passed after the erasing voltage $V_0$ is applied, V1'≧Vth1' applies (condition 2). Subsequently, the erasing voltage $V_0$ is applied between the pair of electrodes 141, 142 and between the pair of electrodes 143, 144 to erase the image pattern. The erasing voltage $V_0$ may also be set to satisfy the expression (1).

Further, the erasing voltage $V_0$ including the time for applying the erasing voltage $V_0$ may also be set as follows. Note here that the erasing voltage $V_0$ may be set to satisfy following two conditions simultaneously. In the first display function layer 12, in a state where the voltages V1 and V2 are determined according to only each static capacitance of the cholesteric layers 16, 17 and the static capacitance of the photoconductive layer 18 immediately after applying the erasing voltage $V_0$ between the pair of electrodes 141 and 142, and then those become close to the values that are determined according to each resistance of the cholesteric layers 16, 17 and the resistance of the photoconductive layer 18, V1≧Vth1 and V2≧Vth2 apply in all the time from the point at which the erasing voltage $V_0$ is applied to the point at which the cholesteric liquid crystal layers 16, 17 change to the homeotropic alignment (condition 3). In the second display function layer 13, in a state where the voltage V1' is determined according to only the static capacitance of the cholesteric liquid crystal layer 20 and the static capacitance of the photoconductive layer 21 immediately after applying the erasing voltage $V_0$ between the pair of electrodes 143 and 144, and then those become close to the values determined according to only the resistance of the cholesteric liquid crystal layer 20 and the resistance of the photoconductive layer 21, V'1≧Vth1' applies in all the time from the point at which the erasing voltage $V_0$ is applied to the point at which the cholesteric liquid crystal layer 20 changes to the homeotropic alignment (condition 4). Note here that the erasing voltage $V_0$ may be set to satisfy the conditions 1, 2 as well in addition to the conditions 3, 4. The erasing voltage $V_0$ may also be set to satisfy the expression (2).

With the erasing method according to the first exemplary embodiment, the same actions and effects as those of the erasing device 7a of the first exemplary embodiment can be achieved. Next, an erasing signal setting method according to the first exemplary embodiment will be described.

The erasing signal setting method according to the first exemplary embodiment is a setting method of the erasing voltage $V_0$ used in the erasing device 7a of the first exemplary embodiment. First, in the first display function layer 12, it is assumed that voltages applied to the cholesteric layers 16 and 17 when the erasing voltage $V_0$ is applied between the pair of electrodes 141, 142 are V1 and V2, respectively, and threshold voltages with which the cholesteric layers 16, 17 change to the homeotropic alignment are Vth1 and Vth2, respectively. In the second display function layer 13, it is assumed that a voltage applied to the cholesteric liquid crystal layer 20 when the erasing voltage $V_0$ is applied between the pair of electrodes 143, 144 is V1', and a threshold voltage with which the cholesteric liquid crystal layer 20 change to the homeotropic alignment is Vth1'. Subsequently, the erasing voltage $V_0$ is set to satisfy following two conditions simultaneously. In a state where the voltages V1 and V2 are determined according to only each resistance of the cholesteric layers 16, 17 and the resistance of the photoconductive layer 18, i.e., in a state where a sufficient time has passed after the erasing voltage $V_0$ is applied, V1≧Vth1 and V2≧Vth2 apply (condition 1). In a state where the voltage V1' is determined according to only the resistance of the cholesteric liquid crystal layer 20 and the resistance of the photoconductive layer 21, i.e., in a state where a sufficient time has passed after the erasing voltage $V_0$ is applied, $V1' \geq Vth1'$ applies (condition 2). The erasing voltage $V_0$ may also be set to satisfy the expression (1).

Further, the erasing voltage $V_0$ including the time for applying the erasing voltage $V_0$ may also be set as follows. Note here that the erasing voltage $V_0$ is set to satisfy following two conditions simultaneously. In the first display function layer 12, in a state where the voltages V1 and V2 are determined according to only each static capacitance of the cholesteric layers 16, 17 and the static capacitance of the photoconductive layer 18 immediately after applying the erasing voltage $V_0$ between the pair of electrodes 141, 142, and then those become close to the values that are determined according to each resistance of the cholesteric layers 16, 17 and the resistance of the photoconductive layer 18, $V1 \geq Vth1$ and $V2 \geq Vth2$ apply in all the time from the point at which the erasing voltage $V_0$ is applied to the point at which the cholesteric liquid crystal layers 16, 17 change to the homeotropic alignment (condition 3). In the second display function layer 13, in a state where the voltage V1' is determined according to only the static capacitance of the cholesteric liquid crystal layer 20 and the static capacitance of the photoconductive layer 21 immediately after applying the erasing voltage $V_0$ between the pair of electrodes 143, 144, and then those become close to the values determined according to only the resistance of the cholesteric liquid crystal layer 20 and the resistance of the photoconductive layer 21, $V'1 \geq Vth1'$ applies in all the time from the point at which the erasing voltage $V_0$ is applied to the point at which the cholesteric liquid crystal layer 20 changes to the homeotropic alignment (condition 4). Note here that the erasing voltage $V_0$ may be set to satisfy the conditions 1, 2 as well in addition to the conditions 3, 4. The erasing voltage $V_0$ may also be set to satisfy the expression (2).

With the erasing signal setting method according to the first exemplary embodiment, the same actions and effects as those of the erasing device 7a of the first exemplary embodiment can be achieved.

Hereinafter, the first exemplary embodiment will be described in more details by referring to the accompanying drawings. Note here that the erasing voltage $V_0$ described above is referred to an erasing signal amplitude $V_0$ as another word. Further, the static capacitance is simply referred to as a "capacitance".

As shown in FIG. 1, the erasing device 7a according to the first exemplary embodiment includes the signal generating section 8a, a terminal section 9a, and a fitting section 10a. Further, as shown in FIG. 2, the display medium 11 is configured with the first display function layer 12 and the second function display layer 13. The first display function layer 12 is formed by laminating the cholesteric crystal layer (referred to as a G layer hereinafter) 16 which reflects green light, the cholesteric crystal layer (referred to as a B layer hereinafter) 17 which reflects blue light, the photoconductive layer 18, and a light shielding layer 19 on a transparent substrate 151 such as a PET on which the electrode 141 is deposited. Further, the second function layer 13 is formed by laminating the cholesteric crystal layer (referred to as an R layer hereinafter) 20 which reflects red light, the photoconductive layer 21, and a light shielding layer 22 on a transparent substrate 152 such as a PET on which the electrode 143 is deposited. The transparent substrate 152 under the first display function layer 12 and the transparent substrate 152 above the second display function layer 13 are used in common. The first display function layer 12 includes the G layer 16 and the B layer 17 which reflect the green light and the blue light, and the second display function layer 13 includes the R layer 20 which reflects the red light. Thus, the display medium 11 can provide a color display by controlling the alignment of each cholesteric liquid crystal layer. Each of the electrodes 141-144 is formed with a transparent conductive film. The light shielding layers 19 and 22 have a function of shielding light of a specific wavelength and transmitting other light.

First, the terminal section 9a and the fitting section 10a of the erasing device 7a will be described. FIG. 3 shows a state where the erasing device 7a is attached to an electrode extracting section 24 of the display medium 11. In the end part of the display medium 11, the electrode extracting sections 241-244 for applying signals for writing image patterns are provided by being corresponded to the first display function layer 12 and the second display function layer 13. Each of the first display function layer 12 and the second display function layer 13 is provided with a pair of electrodes, so that the terminal section 9a also includes four terminal sections 271-274. Accordingly, there are four electrode extracting sections 241-244. Further, a protrusion 25 is provided in the vicinity of the electrode extracting section 244. As shown in FIG. 3, the fitting section 10a provided to the erasing device 7a is in a shape with a recessed part 26. The position of the erasing device 7a is settled when the protrusion 25 of the display medium 11 and the recessed part 26 of the fitting section 10a are engaged with each other, and the terminal sections 271-274 of the erasing device 7a and the electrode extracting sections 241-244 of the display medium 11 can be in contact securely. The erasing signals from the signal generating section 8a are applied to the display medium 11 via the terminal sections 271-274, and the image pattern on the display medium 11 is erased. The shape of the fitting section 10a is not specifically limited, since it only needs to be able to implement a secure contact between the terminal sections 271-274 of the erasing device 7a and the electrode extracting sections 241-244 of the display medium 11 when applying the erasing signals.

Next, the signal generating section 8a will be described. The signal generating section 8a generates erasing signals. For example, the signal generating section 8a is a typical power supply which outputs a square wavelength voltage and a direct current voltage, and it has a function capable of setting the output voltage and output time thereof to an arbitrary value. The erasing signal is a voltage value with which a voltage of equal to or more than the threshold voltage that changes the entire region of the G layer 16, the B layer 17, and the R layer 20 to the homeotropic alignment is applied to the G layer 16, the B layer 17, and the R layer 20. FIG. 4 is an illustration showing connections of the signal generating section 8a, the first display function layer 12, and the second display function layer 13. The erasing signal (amplitude $V_0$) from the signal generating section 8a is applied in parallel to the first display function layer 12 and the second display function layer 13 via the terminal sections 271-274.

Hereinafter, an erasing action of the cholesteric liquid crystal layer will be described in details. FIG. 5 is a graph showing the behaviors of changes in the alignment of the cholesteric liquid crystal layer. The lateral axis of the graph shows the voltage applied to the cholesteric liquid crystal layer, and the longitudinal axis shows the reflectance when the applied voltage is turned to zero radically. Further, a dotted line shows the behavior of changes in the alignment when the initial state of the cholesteric liquid crystal layer is the planer alignment, and a solid line shows the behavior in the changes of the alignment when the initial state is the focal conic alignment.

In a case where the initial state is the planar alignment, a part of the cholesteric liquid crystal layers changes to the focal conic alignment when the applied voltage is increased from zero. The focal conic alignment transmits the incident light, so that the reflectance is decreased. When the voltage of A in FIG. 5 is applied, the entire cholesteric liquid crystal layers change to the focal conic alignment completely, so that the reflectance becomes the minimum. When the applied voltage is increased further, a part of the cholesteric liquid crystal layers changes to the homeotropic alignment. The homeotropic alignment is in a state that transmits the incident light and reduces the reflectance, however, it is an alignment that appears only when the voltage is applied. That is, when the voltage being applied is eliminated radically, the spiral structure of the homeotropic alignment is restored and it is eased to the planar alignment. As a result, the reflectance becomes increased. When the voltage that is equal to or more than $B_1$ of FIG. 5 is applied, the entire cholesteric liquid crystal layers change to the homeotropic alignment completely. Therefore, after eliminating the voltage, the entire cholesteric liquid crystal layers are eased to the planar alignment, and the reflectance becomes equal to the reflectance before the voltage is applied.

In the meantime, in a case where the initial state is the focal conic alignment, the cholesteric liquid crystal layer remains as the focal conic alignment even when the applied voltage is increased from zero. Thus, the low reflectance can be maintained. When the applied voltage is increased further from the voltage of A, a part of the cholesteric liquid crystal layers change to the homeotropic liquid crystal layer, so that the reflectance is increased. When the voltage that is equal to or more than $B_2$ of FIG. 5 is applied, the entire cholesteric liquid crystal layers change to the homeotropic alignment. Thus, as in the case where the initial state is the planar alignment, the entire cholesteric liquid crystal layers are eased to the planar alignment. Therefore, the reflectance becomes increased as shown in the graph.

With the homeotropic alignment, the spiral structure peculiar to the cholesteric liquid crystal is unraveled regardless of the alignment before the voltage is applied. Thus, it is utilized as a reset operation. Further, the homeotropic alignment does not necessarily change to the planar alignment after the voltage is applied. When the voltage being applied is eliminated gradually, the homeotropic alignment changes to the focal conic alignment.

Figure 6A:
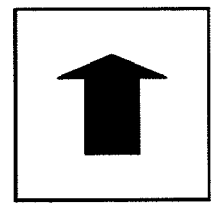
FIG. 6A is an illustration showing an example of an image pattern recorded on the display medium.

FIG. 6A is an example of the image pattern recorded on the display medium, which shows a state where an arrow (black) in the focal conic alignment that is in a transmission state is displayed on the cholesteric liquid crystal layer in the reflection state, i.e., a background (white) in the planar alignment. As a method for erasing the image pattern, there is considered a method which acquires a transmission-state screen by changing the entire region of the cholesteric liquid crystal layers to the focal conic alignment, and a method which executes a reset operation that changes the entire region of the cholesteric liquid crystal layers to the homeotropic alignment.

Figure 6B:
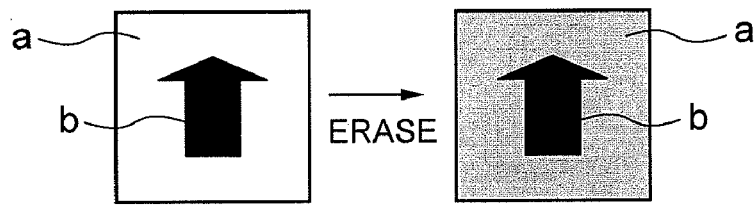
FIG. 6B is an illustration for describing generation of an afterimage in a case where erasure is performed with voltage of A in FIG. 5 in the image pattern recorded on the display medium.

In order to have the transmission-state screen, the voltage of A shown in FIG. 5 may simply be applied to the cholesteric liquid crystal layer. However, when the applied voltage changes slightly, there is a possibility of generating an afterimage. FIG. 6B is an illustration for describing generation of an afterimage in the image pattern of FIG. 6A. The background part a is in the planar alignment. Thus, when the voltage of A shown in FIG. 5 is applied, it changes to the transmission-state focal conic alignment which is the same alignment as that of an arrow part b. However, when a voltage that is slightly smaller than the voltage of A is applied, the background part a cannot be changed to the perfect focal conic alignment and the reflectance becomes slightly higher than that of the arrow part b. As a result, there is a slight contrast generated between the background part a and the arrow part b on the erasing screen as shown in FIG. 6B.

Figure 6C:
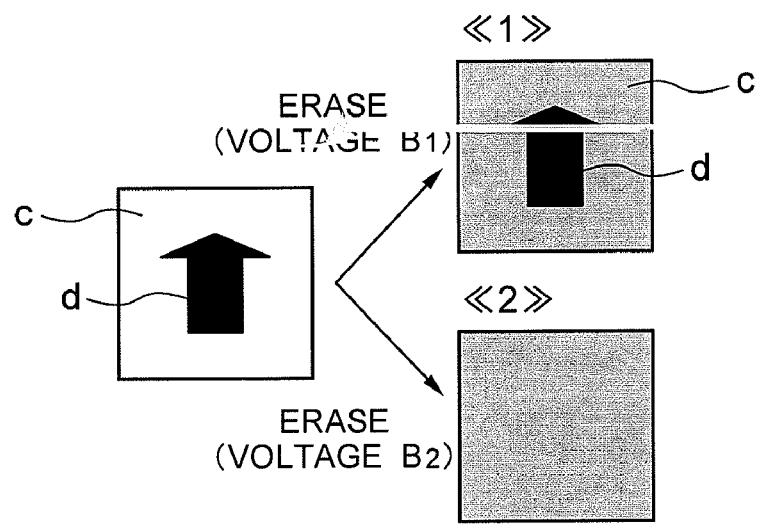
FIG. 6C is an illustration for describing generation of an afterimage in a case where erasure is performed with voltages of $B_1$ and $B_2$ in FIG. 5 in the image pattern recorded on the display medium.

In order to execute the reset operation, the voltage with which the cholesteric liquid crystal layer changes to the homeotropic alignment may simply be applied. FIG. 6C is an illustration for describing an erasing action executed on the image pattern of FIG. 6A. When the voltage of $B_1$ shown in FIG. 5 is applied, the part where the initial state is the planar alignment, i.e., a background part c, changes to the homeotropic alignment completely, so that a reset operation can be done. However, in the part where the initial state is the focal conic alignment, i.e., an arrow part d, a part of the cholesteric liquid crystal layer does not change to the homeotropic alignment, so that a reset operation cannot be done. Therefore, as shown in I of FIG. 6C, there is a slight contrast generated between the background part c and the arrow part d on the erasing screen. However, when the voltage of $B_2$ shown in FIG. 5 is applied, both the background part c and the arrow part d change to the perfect homeotropic alignment, so that a reset operation can be done. Therefore, as shown in II of FIG. 6C, there is no afterimage generated on the erasing screen. This voltage of $B_2$ is the threshold voltage with which the cholesteric liquid crystal layer changes to the homeotropic alignment.

Figure 7:
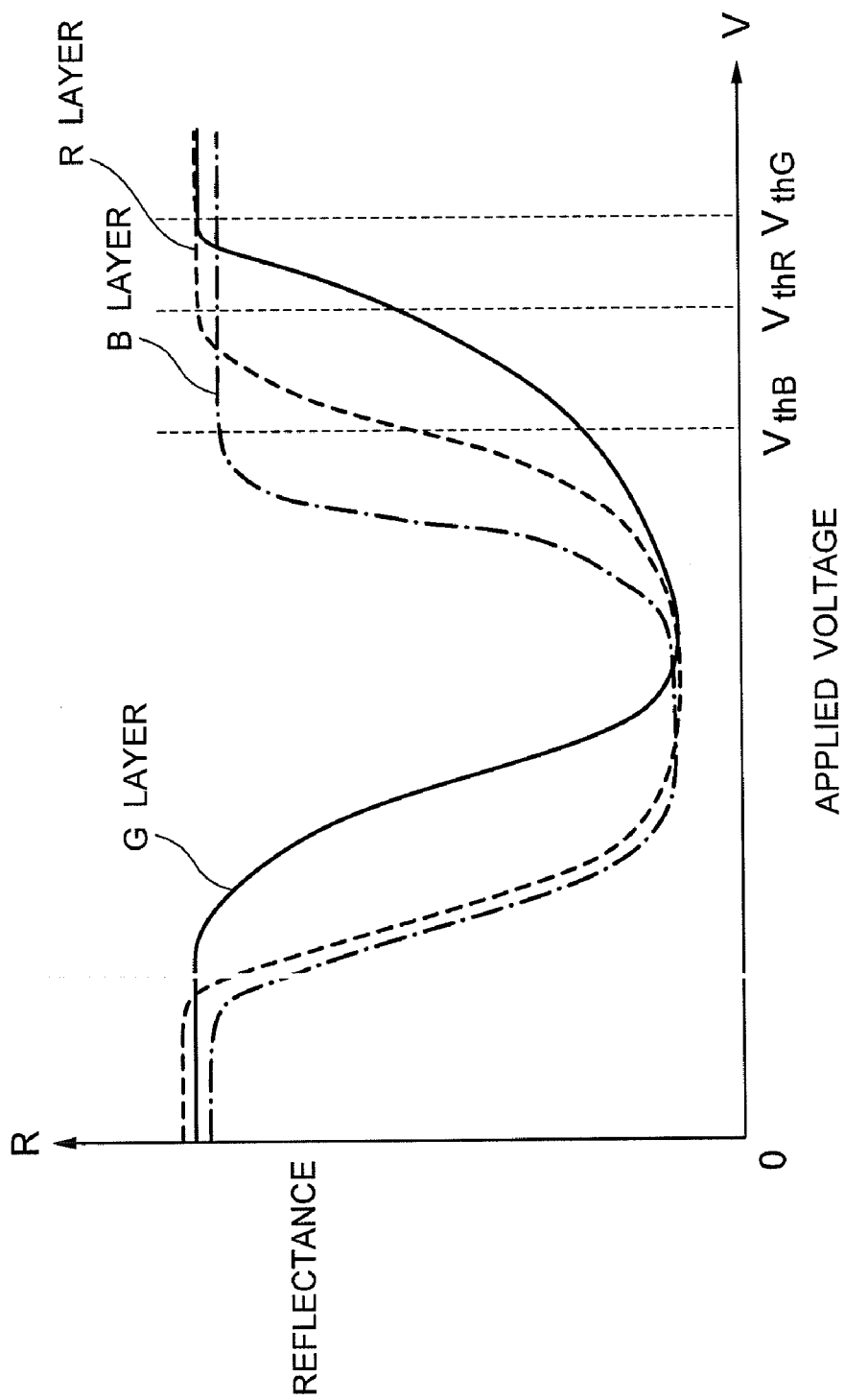
FIG. 7 is an illustration for describing the behaviors of changes in the alignment of the cholesteric liquid crystal that configures the display medium according to the first exemplary embodiment.
Figure 8:
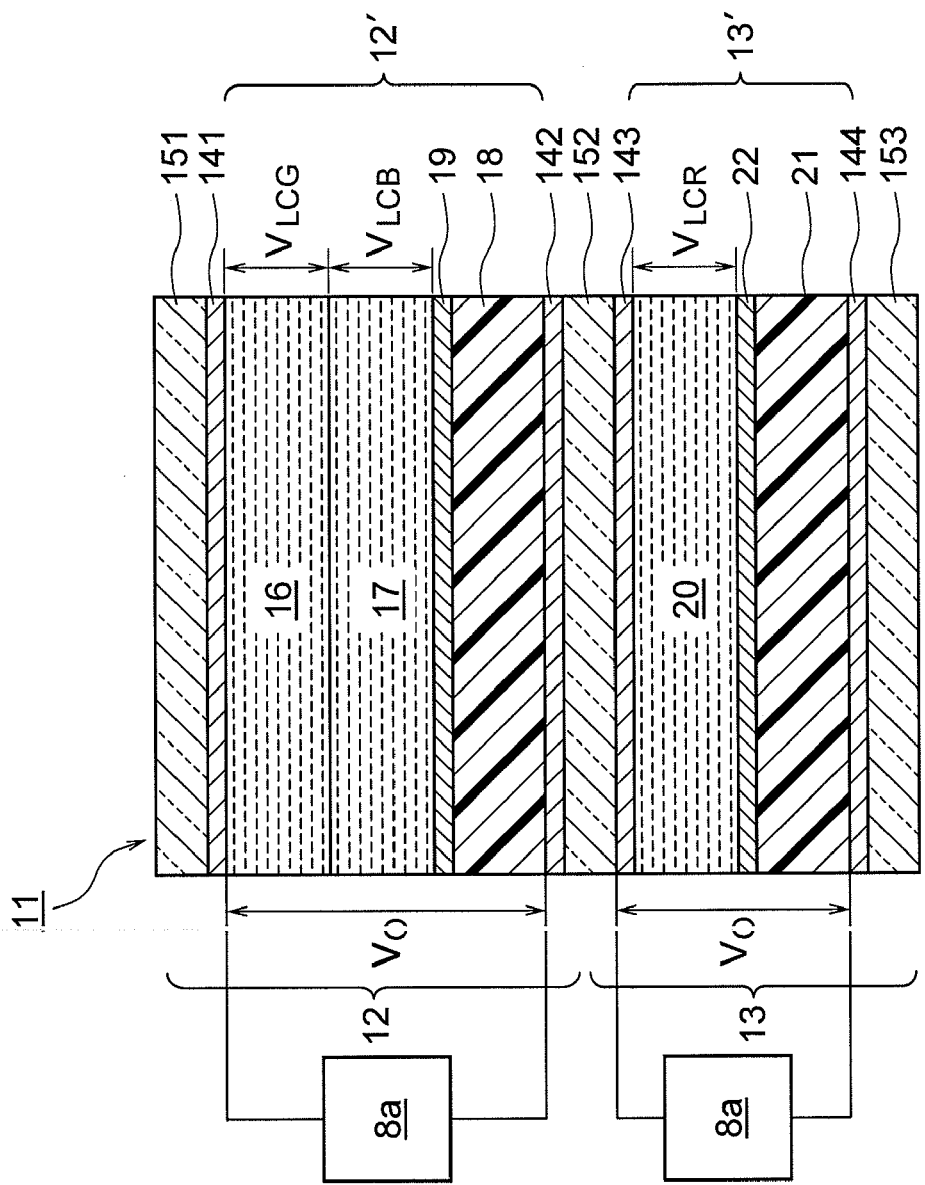
FIG. 8 is an illustration for describing the voltage applied to the display medium according to the first exemplary embodiment.

Hereinafter, the erasing signal generated by the signal generating section 8a of the first exemplary embodiment will be described. The erasing signal of the exemplary embodiment is an alternating current signal with the amplitude $V_0$. FIG. 7 shows the behaviors of changes in the alignments of the G layer 16, the B layer 17, and the R layer 20 as the cholesteric liquid crystal layers. Further, FIG. 8 shows the voltages applied to the cholesteric liquid crystal layers (the G layer 16, the B layer 17, and the R layer 20). When the alternating current signal is applied from the signal generating section 8a, there is generated a potential difference of $V_0$ between the pair of electrodes 141, 142 and between the pair of electrodes 143, 144, and divided voltages according to the potential difference are applied to the G layer 16, the B layer 17, and the R layer 20. It is defined here that the voltages applied to the G layer 16, the B layer 17, and the R layer 20 are $V_{LCG}$, $V_{LCB}$, and $V_{LCR}$, respectively. Assuming that the threshold voltages of the G layer 16, the B layer 17, and the R layer 20 are $V_{thG}$, $V_{thB}$, and $V_{thR}$, respectively, the amplitude $V_0$ of the erasing signal generated by the signal generating section 8a is set to satisfy all the expressions $V_{LCG} \geq V_{thG}$, $V_{LCB} \geq V_{thB}$, and $V_{LCR} \geq V_{thR}$.

The cholesteric liquid crystal layer (the G layer 16, the B layer 17, and the R layer 20) and the photoconductive layers 18, 21 are considered to have a capacitance component and a resistance component. Immediately after a certain voltage is applied to the first display function layer 12 and the second display function layer 13, voltages (capacitance divided voltages) are applied to the respective layers according to the capacitance ratio of the G layer 16, the B layer 17, the R layer 20, and the photoconductive layers 18, 21. Thereafter, electric currents start to flow into the resistance components of the G layer 16, the B layer 17, the R layer 20, and the photoconductive layers 18, 21, and the voltages applied to the G layer 16, the B layer 17, the R layer 20, and the photoconductive layers 18, 21 change to the voltages (resistance divided voltages) according to the resistance ratio in a period of charging/discharging time constant of the first display function layer 12 and the second display function layer 13.

As shown in FIG. 2, the first display function layer 12 includes the cholesteric liquid crystal layers configured with the G layer 16, the B layer 17, and the photoconductive layer 18. The capacitances of the G layer 16, the B layer 17, and the photoconductive layer 18 are almost the same, and resistances of the G layer 16 and the B layer 17 are also almost the same. In the photoconductive layer 18, the resistance in a light irradiated part and that of a non-irradiated part at the time of writing an image pattern vary by about one thousand times. Normally, the resistance of the photoconductive layer 18 in the irradiated part is set to be about 1/100 of the resistance of the cholesteric liquid crystal layer. Thus, when there is no writing light, the resistance of the photoconductive layer 18 is about 1/10 of the resistance of the cholesteric liquid crystal layer. Therefore, the capacitance divided voltages of the G layer 16 and the B layer 17 becomes a voltage of about 1/3 of the amplitude of the erasing signal. Similarly, the resistance divided voltage becomes a voltage of about 1/12 of the amplitude of the erasing signal. Thus, the resistance divided voltages become smaller than the capacitance divided voltages.

Provided that the number of cholesteric liquid crystal layers contained in the display function layer is n, the resistance of the cholesteric liquid crystal layer is $R_{LC}$, the capacitance thereof is $C_{LC}$, the resistance of the photoconductive layer is $R_{PC}$, and the capacitance thereof is $C_{PC}$, a following expression applies in general when there is no writing light from the relative values of the capacitance divided voltage and the resistance divided voltage applied to the cholesteric capacitance layer.

[Numerical Expression 3]

$$\frac{C_{PC}}{C_{LC} + nC_{PC}} > \frac{R_{LC}}{nR_{LC} + R_{PC}} \quad (3)$$

The voltage applied to the cholesteric liquid crystal layer changes from the capacitance divided voltage to the resistance divided voltage. Thus, when at least the resistance divided voltage is larger than the threshold voltage, a necessary voltage can be applied to the cholesteric liquid crystal layer. Provided that the resistance of the G layer 16 and the B layer 17 is $R_{LC}$ and the resistance of the photoconductive layer 18 is $R_{PC}$, the voltages $V_{LCG}$ and $V_{LCB}$ applied to the G layer 16 and the B layer 17 can be expressed by a following expression.

[Numerical Expression 4]

$$V_{LCG} = V_{LCB} = \frac{R_{LC}}{2R_{LC} + R_{PC}} V_0 \quad (4)$$

When the voltage shown by the expression (4) is equal to or more than $V_{thG}$ and equal to or more than $V_{thB}$, the entire region of the cholesteric liquid crystal layers (the G layer 16 and the B layer 17) of the first display function layer 12 changes to the homeotropic alignment. As shown in FIG. 7, $V_{thG}$ is larger than $V_{thB}$, and $V_{LCG}$ is equal to $V_{LCB}$. Thus, it can be said that $V_{LCB} \geq V_{thB}$ applies when $V_{LCG} \geq V_{thG}$. Therefore, the amplitude of the erasing signal applied to the first display function layer 12 is set to be equal to or larger than the voltage $V_1$ of a following expression.

[Numerical Expression 5]

$$V_1 = \frac{2R_{LC} + R_{PC}}{R_{LC}} V_{thG} \quad (5)$$

Further, as shown in FIG. 2, the second display function layer 13 includes the cholesteric liquid crystal layer configured with the R layer 20 and the photoconductive layer 21. As in the case of the first display function layer 12, the resistance of the photoconductive layer 21 is about ten times that of the cholesteric liquid crystal layer, so that the resistance divided voltage is a voltage of about 1/11 of the amplitude of the erasing signal. Further, the capacitance of the photoconductive layer 21 is almost the same as that of the cholesteric liquid crystal layer, so that the capacitance divided voltage is about 1/2 of the amplitude of the erasing signal. Thus, the resistance divided voltage becomes smaller than the capacitance divided voltage. Therefore, when at least the resistance divided voltage is larger than the threshold voltage, a necessary voltage can be applied to the cholesteric liquid crystal layer. Provided that the resistance of the R layer 20 is $R_{LC}$ and the resistance of the photoconductive layer 21 is $R_{PC}$, the voltage $V_{LCR}$ applied to the R layer 20 can be expressed by a following expression.

[Numerical Expression 6]

$$V_{LCR} = \frac{R_{LC}}{R_{LC} + R_{PC}} V_0 \quad (6)$$

When the voltage shown by the expression (6) is equal to or larger than $V_{thR}$, the entire region of the cholesteric liquid crystal layer (the R layer 20) changes to the homeotropic alignment. Therefore, the amplitude of the erasing signal applied to the second display function layer 13 is set to be equal to or larger than the voltage $V_2$ of a following expression.

[Numerical Expression 7]

$$V_2 = \frac{R_{LC} + R_{PC}}{R_{LC}} V_{thR} \quad (7)$$

Comparing the amplitude $V_1$ of the erasing signal applied to the first display function layer 12 and the amplitude $V_2$ of the erasing signal applied to the second display function layer 13, $V_1$ is larger. The erasing signal generated by the signal generating section 8a is applied simultaneously to the first display function layer 12 and the second display function layer 13, so that the set value of the amplitude of the erasing signal is $V_1$. That is, the amplitude $V_0$ of the erasing signal from the signal generating section 8a is set according to a following expression.

[Numerical Expression 8]

$$V_0 \geq \frac{2R_{LC} + R_{PC}}{R_{LC}} V_{thG} \quad (8)$$

The signal generating section 8a generates an erasing signal that satisfies the expression (8), and applies the erasing signal to the display medium 11 in an applying time of equal to or longer than a period (about 20 ms) that is necessary for the cholesteric liquid crystal layer to change to the homeotropic alignment from the planar alignment or the focal conic alignment.

The first exemplary embodiment is so structured that the same erasing signal is applied to the first display function layer 12 and the second display function layer 13. However, it is also possible to employ a structure in which different erasing signals are applied to the first display function layer 12 and the second display function layer 13, respectively. In that case, the signal generating section generates two kinds of erasing signals. The amplitude of the erasing signal applied to the first display function layer 12 is set to a voltage of equal to or larger than $V_0$ according to the expression (8), and the amplitude of the erasing signal applied to the second display function layer 13 is set to a voltage of equal to or larger than $V_2$ according to the expression (7).

As described above, in the first exemplary embodiment, the signal generating section 8a generates the erasing signal and applies it to the display medium 11. Thereby, the voltages of equal to or larger than the respective threshold voltages are applied to the G layer 16 and the B layer 17 of the first display function layer 12 and the R layer 20 of the second display function layer 13, so that reset operations can be done in each layer. Thus, it is possible to achieve the erasing device 7a that is capable of securely erasing the image pattern by suppressing an afterimage. Further, with the first exemplary embodiment, it is possible to set the minimum amplitude of the erasing signal required for the reset operation based on the expression (8) that is expressed with the resistance $R_{LC}$ of the G layer 16 and the B layer 17, the resistance $R_{PC}$ of the photoconductive layer 18, the and the threshold voltage $V_{thG}$ of the G layer 16 within the first display function layer 12. Thus, it is possible to achieve the erasing device 7a of suppressed power consumption. Further, external light of an exposure device and the like is not required with the exemplary embodiment, so that the erasing device 7a can perform erasing operations regardless of the places.

In order for the display medium to be able to provide a color display, it is necessary to have a structure configured with two display function layers formed with a display function layer including the B layer and the G layer and a display function layer including the R layer as in the case of the first exemplary embodiment, a structure configured with a single display function layer including three layers of a B layer, a G layer, and an R layer, or a structure configured with three display function layers each containing a B layer, a G layer, and an R layer.

With the structure configured with the two display function layers, the B layer and the G layer need to be controlled individually by one kind of voltage. Thus, the threshold voltages of the B layer and the G layer are different. Normally, the threshold voltages of the two layers are made different by increasing the threshold voltage of either the B layer or the G layer. That is, the display function layer including the two cholesteric liquid crystal layers is to include the cholesteric liquid crystal layer of the greatest threshold voltage. In the meantime, with the structure configured with a single display function layer, each layer is controlled individually by one kind of voltage also by varying the threshold voltages of the three cholesteric liquid crystal layers. Therefore, the amplitude $V_0$ of the erasing signal applied respectively to the display medium configured with the two display function layers and to the display medium configured with a single display function layer is set according to a following expression.

[Numerical Expression 9]

$$V_0 \geq \frac{nR_{LC} + R_{PC}}{R_{LC}} V_{thmax} \quad (1)$$

Note that "n" shows the number of the cholesteric liquid crystal layers contained in the display function layer whose number of the cholesteric liquid crystal layers is the maximum out of the display function layers, and $V_{thmax}$ shows the maximum value of the threshold voltages of each cholesteric liquid crystal layer. The expression (1) can also be applied to the display medium in a structure configured with three display function layers when n=1.

The amplitude $V_0$ of the erasing signal is set by the signal generating section according to the expression (1) described above, so that it is possible to erase the image in the display medium capable of providing a color display even in the cases where the number of display function layers configuring the display medium is different. Further, the minimum amplitude of the erasing signal necessary for reset operations can be set according to the expression (1) that is expressed with the respective resistance values of the cholesteric liquid crystal layer and the photoconductive layer within the display function layer and the threshold voltage of the cholesteric liquid crystal layer. Therefore, it is possible to achieve the erasing device of suppressed power consumption.

A case where the erasing signal is an alternating current signal has been described heretofore. However, in a case where the erasing signal is a direct current signal, the potential difference applied between the electrodes of the display function layer is also set in the same manner as the amplitude of the alternating current signal. In the case of the direct current signal, the power consumption of the erasing device can be suppressed compared to the case of the alternating current signal.

Next, as another example of the first exemplary embodiment, another method for setting the amplitude of the erasing signal will be described. Here, the amplitude of the erasing signal is set according to the capacitance divided voltage applied to the cholesteric liquid crystal layer and the changing time thereof.

As described above, immediately after a certain voltage is applied to the display function layer, the capacitance divided voltage determined according to the capacitance ratio of the cholesteric liquid crystal layer and the photoconductive layer is applied to the cholesteric liquid crystal layer.

Thereafter, the voltage applied to the cholesteric liquid crystal layer is changed to the resistance divided voltage that is determined according to the resistance ratio of the cholesteric liquid crystal layer and the photoconductive layer. Normally, the capacitance divided voltage applied to the cholesteric liquid crystal layer is larger than the resistance divided voltage.

The voltage $V_{LC}$ applied to the cholesteric liquid crystal layer after time t has passed from a start of applying a voltage can be expressed by a following expression, provided that the capacitance of the photoconductive layer is $C_{PC}$, the resistance thereof is $R_{PC}$, the capacitance of the cholesteric liquid crystal layer is $C_{LC}$, the resistance thereof is $R_{LC}$, and the charging/discharging time constant is $\tau$.

[Numerical Expression 10]

$$V_{LC} = \left(\frac{C_{PC}}{C_{PC}+C_{LC}} - \frac{R_{LC}}{R_{PC}+R_{LC}}\right)V_0\exp\left(-\frac{t}{\tau}\right) + \frac{R_{LC}}{R_{PC}+R_{LC}}V_0 \quad (9)$$

Each of the voltages $V_{LCG}$ and $V_{LCB}$ applied to the G layer 16 and the B layer 17 of the first display function layer 12 can be expressed by a following expression, since the capacitance and resistance of the G layer 16 are almost equal to the capacitance and the resistance of the B layer 17, and the capacitance of the cholesteric liquid crystal layer combining the G layer 16 and the B layer 17 is ½ $C_{LC}$.

[Numerical Expression 11]

$$V_{LCG} = V_{LCB} \quad (10)$$

$$= \left(\frac{1}{2}\frac{C_{PC}}{C_{PC}+\frac{1}{2}C_{LC}} - \frac{R_{LC}}{R_{PC}+2R_{LC}}\right)V_0\exp\left(-\frac{t}{\tau}\right) + \frac{R_{LC}}{R_{PC}+R_{LC}}V_0$$

$$= \left(\frac{C_{PC}}{2C_{PC}+C_{LC}} - \frac{R_{LC}}{R_{PC}+2R_{LC}}\right)V_0\exp\left(-\frac{t}{\tau}\right) + \frac{R_{LC}}{R_{PC}+2R_{LC}}V_0$$

Figure 9:
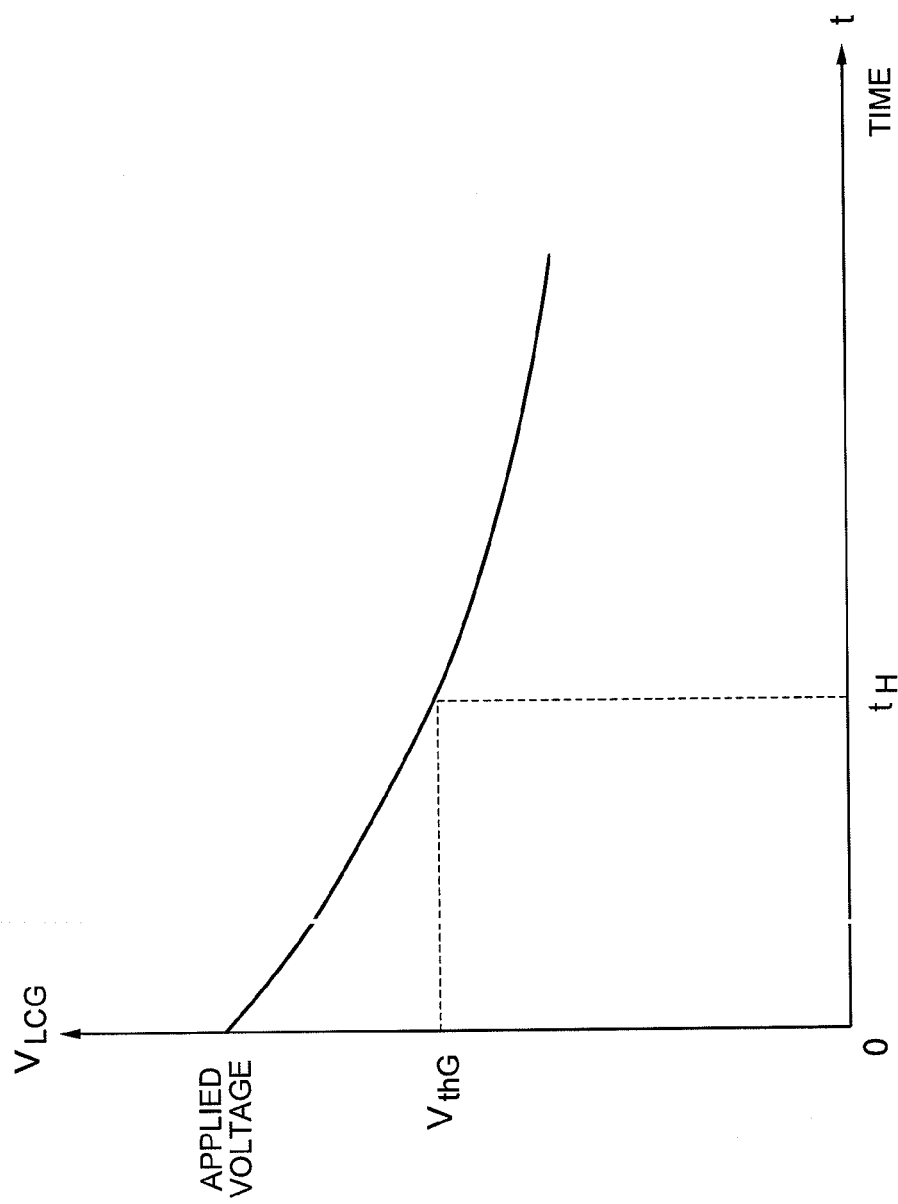
FIG. 9 is a graph showing timing chart of the voltage applied to the cholesteric liquid crystal layer according to another example of the first exemplary embodiment.

FIG. 9 is an example showing timing chart in the voltage $V_{LCG}$ applied to the cholesteric liquid crystal layer (the G layer 16). It is assumed that the start of applying the voltage is t=0, and the period required for the cholesteric liquid crystal layer to change to the homeotropic alignment is $t_H$. As shown in FIG. 9, when the voltage $V_{LCG}$ is equal to or higher than $V_{thG}$ at t=$t_H$, the voltage of equal to or higher than $V_{thG}$ is applied to the cholesteric liquid crystal layer from the start of applying the voltage to the time $t_H$. Thus, the cholesteric liquid crystal layer securely changes to the homeotropic alignment. Therefore, according to the expression (9), the amplitude of the erasing signal to be applied to the first display function layer 12 is set to be equal to or larger than the voltage $V_1$ in a following expression.

[Numerical Expression 12]

$$V_1 = \frac{V_{thG}}{\left(\frac{C_{PC}}{2C_{PC}+C_{LC}} - \frac{R_{LC}}{R_{PC}+2R_{LC}}\right)\exp\left(-\frac{t_H}{\tau}\right) + \frac{R_{LC}}{R_{PC}+2R_{LC}}} \quad (11)$$

In the meantime, the voltage $V_{LCR}$ applied to the R layer 20 of the second display function layer 13 after the time t has passed from the start of applying the voltage is expressed by a following expression.

[Numerical Expression 13]

$$V_{LCR} = \left(\frac{C_{PC}}{C_{PC}+C_{LC}} - \frac{R_{LC}}{R_{PC}+R_{LC}}\right)V_0\exp\left(-\frac{t}{\tau}\right) + \frac{R_{LC}}{R_{PC}+R_{LC}}V_0 \quad (12)$$

Since the voltage $V_{LCR}$ expressed by the expression (11) at the time $t_H$ may simply need to be equal to or larger than $V_{thR}$, the amplitude of the erasing signal applied to the second display function layer 13 is set to be equal to or larger than the voltage $V_2$ of a following expression.

[Numerical Expression 14]

$$V_2 = \frac{V_{thR}}{\left(\frac{C_{PC}}{C_{PC}+C_{LC}} - \frac{R_{LC}}{P_{PC}+R_{LC}}\right)\exp\left(-\frac{t_H}{\tau}\right) + \frac{R_{LC}}{R_{PC}+R_{LC}}} \quad (13)$$

Comparing the amplitude $V_1$ of the erasing signal applied to the first display function layer 12 and the amplitude $V_2$ of the erasing signal applied to the second display function layer 13, $V_1$ is larger. The erasing signal generated by the signal generating section 8a is applied simultaneously to the first display function layer 12 and the second display function layer 13, so that the set value of the amplitude of the erasing signal is $V_1$. That is, the amplitude $V_0$ of the erasing signal from the signal generating section 8a is set according to a following expression.

[Numerical Expression 15]

$$V_0 \geq \frac{V_{thG}}{\left(\frac{C_{PC}}{2C_{PC}+C_{LC}} - \frac{R_{LC}}{R_{PC}+2R_{LC}}\right)\exp\left(-\frac{t_H}{\tau}\right) + \frac{R_{LC}}{R_{PC}+2R_{LC}}} \quad (14)$$

The signal generating section 8a generates an erasing signal that satisfies the expression (14), and applies the erasing signal to the display medium 11 in an applying time of equal to or longer than periods (about 20 ms for both periods) necessary for the cholesteric liquid crystal layer to change to the planar alignment and to change to the homeotropic alignment from the focal conic alignment.

As described above, in another example of the first exemplary embodiment, the signal generating section generates the erasing signal and applies it to the display medium. Thereby, the voltages of equal to or larger than the respective threshold voltages are applied to the G layer and the B layer of the first display function layer and the R layer of the second display function layer, so that reset operations can be done in each layer. Thus, it is possible to achieve the erasing device that is capable of securely erasing the image pattern by suppressing an afterimage. Further, with this another example of the first exemplary embodiment, it is possible to set the minimum amplitude of the erasing signal required for the reset operation based on the expression (13) that is expressed with respective capacitance values of the liquid crystal layer and the photoconductive layer within the display function layer, the threshold voltage of the G layer, and the charging/discharging time constant of the display function layers, in a case where the erasing signal is set based on the capacitance divided voltage and the chronological change thereof. Thus, it is possible to achieve the erasing device of suppressed power consumption. Further, external light of an exposure device and the like is not required with this another example of the exemplary embodiment, so that the erasing device is capable of erasing operations regardless of the places.

In the first exemplary embodiment, the amplitude $V_0$ of the erasing signal applied respectively to the display medium configured with the two display function layers and to the display medium configured with a single display function layer is set according to a following expression.

[Numerical Expression 16]

$$V_0 \geq \frac{V_{thmax}}{\left(\frac{C_{PC}}{nC_{PC}+C_{LC}} - \frac{R_{LC}}{R_{PC}+nR_{LC}}\right)\exp\left(-\frac{t_H}{\tau}\right) + \frac{R_{LC}}{R_{PC}+nR_{LC}}} \quad (2)$$

Note that n shows the number of the cholesteric liquid crystal layers contained in the display function layer whose number of the cholesteric liquid crystal layers is the maximum out of the display function layers, and $V_{thmax}$ shows the maximum value of the threshold voltages of each cholesteric liquid crystal layer. The expression above can also be applied to the display medium that is in a structure configured with three display function layers.

The amplitude $V_0$ of the erasing signal is set by the signal generating section according to the expression described above, so that it is possible to erase the image on the display medium capable of providing a color display even in the cases where the number of display function layers configuring the display medium is different. Further, the minimum amplitude of the erasing signal necessary for reset operations can be set according to the expression (2) that is expressed with the respective resistance values of the cholesteric liquid crystal layer and the photoconductive layer within the display function layer, the maximum value of the threshold voltages of the cholesteric liquid crystal layer, and the charging/discharging time constant of the display function layer. Therefore, it is possible to achieve the erasing device of suppressed power consumption.

As exemplary advantages according to the invention, the present invention is capable of making the erasing voltage to be a minimum necessary value by clarifying that the voltage applied to the cholesteric liquid crystal layer is determined according only to the resistance of the cholesteric liquid crystal layer and the resistance of the photoconductive layer when applying the erasing voltage to the laminate of the cholesteric liquid crystal layer and the photoconductive layer, and by setting the erasing voltage in such a manner that the voltage surely exceeds the threshold voltage. Therefore, it is possible to achieve low power consumption. This makes it possible to provide the erasing device in which the power consumption required for the erasing operation is suppressed, and with which the portability of the optical writing type display medium is not ruined.

(Second Exemplary Embodiment)

Figure 10:
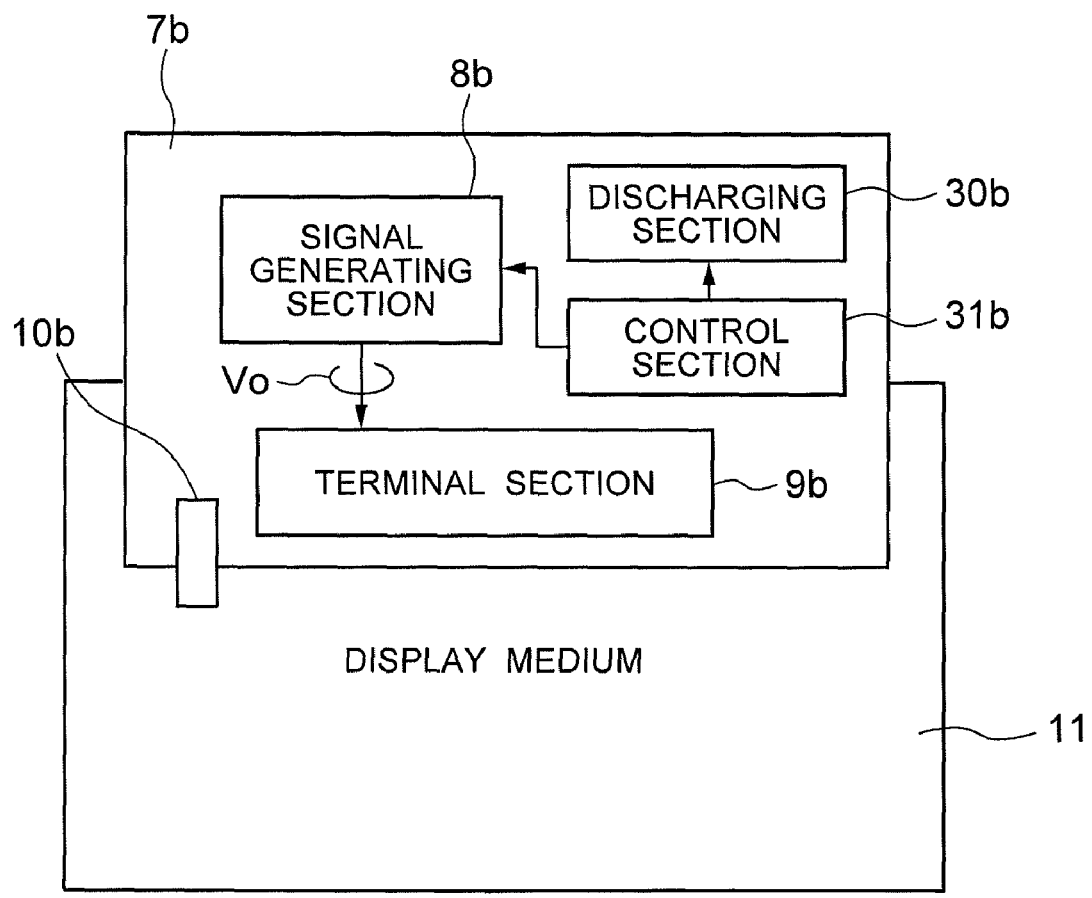
FIG. 10 is a conceptual illustration showing the structure of an erasing device according to a second exemplary embodiment.
Figure 11:
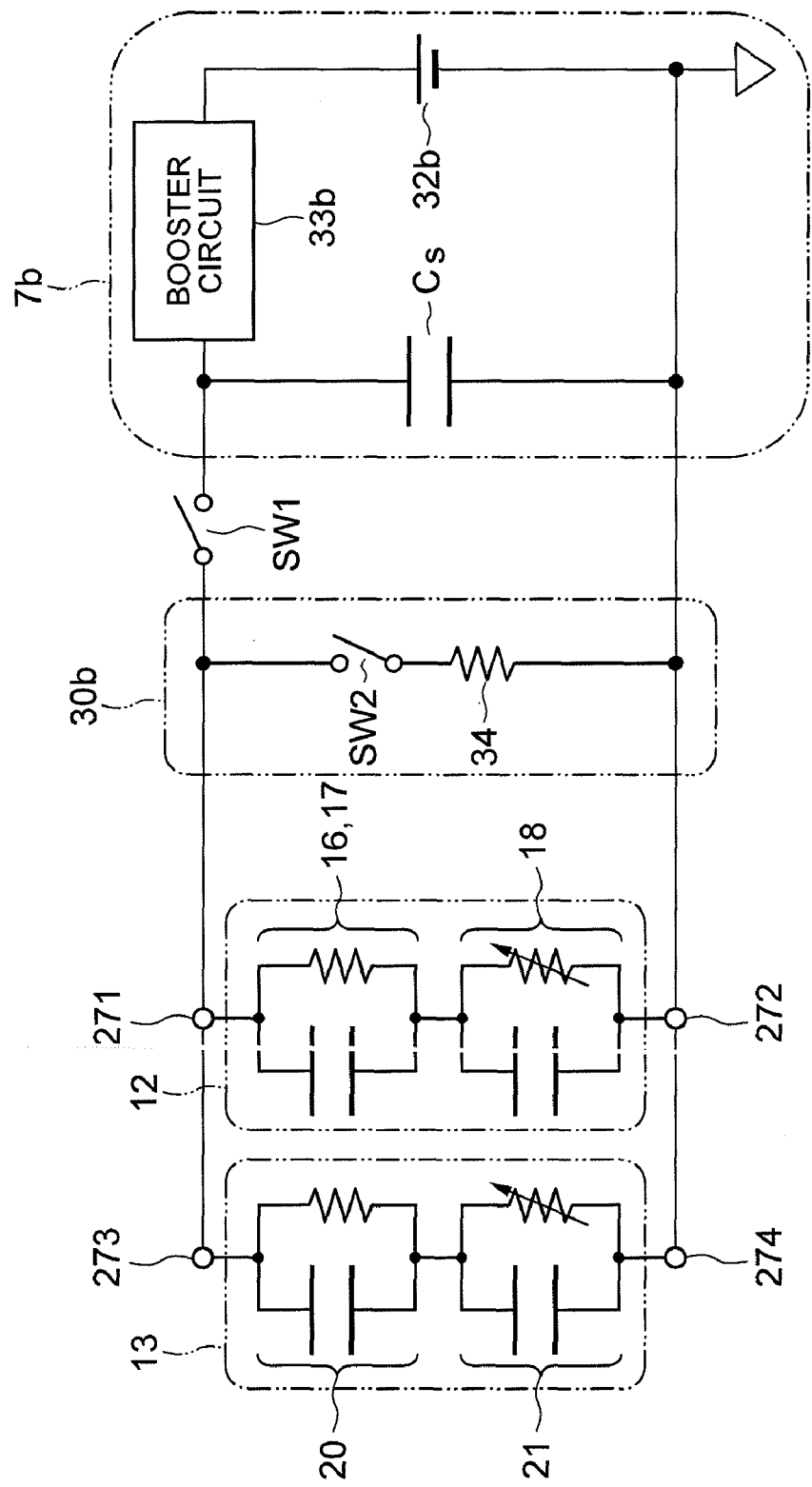
FIG. 11 is an illustration showing an equivalent circuit of a case where the erasing device and a display medium according to the second exemplary embodiment are connected.

FIG. 10 is a conceptual illustration showing the structure of an erasing device according to a second exemplary embodiment. FIG. 11 is an illustration showing an equivalent circuit of a case where the erasing device and a display medium according to the second exemplary embodiment are connected. FIG. 12 is a graph for describing timing chart in the voltage applied to a display function layer and a signal voltage outputted from a control section according to the second exemplary embodiment. FIG. 13A is an illustration showing an equivalent circuit of the display function layer according to the second exemplary embodiment, and FIG. 13B is an illustration showing an equivalent circuit when the display function layer according to the second exemplary embodiment is connected to a discharging section. Hereinafter, the second exemplary embodiment will be described by referring to FIG. 10-FIG. 13. The display medium of the second exemplary embodiment is the same as the display medium of the first exemplary embodiment, so that FIG. 2 and FIG. 8 will be used for that.

An erasing device 7b according to the second exemplary embodiment is characterized to further include a discharging section 30b which eliminates the voltage remained in the first display function layer 12 and the second display function layer 13 after applying the erasing voltage $V_0$. As shown in FIG. 10, the erasing device 7b includes a signal generating section 8b, a terminal section 9b, a fitting section 10b, the discharging section 30b, and a control section 31b. The functions of the terminal section 9b and the fitting section 10b, the connecting method of the erasing device 7b and the display medium 11, and the structure of the display medium 11 according to the second exemplary embodiment are the same as those of the first exemplary embodiment. The voltage of the direct-current erasing signal generated by the signal generating section 8b is set in the manner as described in the first exemplary embodiment. By applying the erasing signal, the voltage of equal to or larger than the threshold voltage is applied to all the cholesteric liquid crystal layers of the first display function layer 12 and the second display function layer 13.

FIG. 11 shows an equivalent circuit in a state where the erasing device 7b and the display medium 11 are connected. The signal generating section 8b is configured with a power supply 32b such as a dry battery, a booster circuit 33b, a smoothing capacitor $C_S$ and the like. Further, a switch SW1 is provided between the signal generating section 8b and the discharging section (i.e., the discharging circuit) 30b, and a switch SW2 is provided within the discharging section 30b. The discharging section 30b includes a series circuit configured with the switch SW2 and a resistor 34. The resistor 34 functions to protect the switch SW2 by limiting the electric currents at the time of discharge and to consume the power at the time of discharge. The switches SW1 and SW2 are formed with a switching element, an electromagnetic relay, or the like, for example. The switches SW1 and SW2 are switched to ON and OFF by a signal from the control section 31b, and are turned to a conductive state when switched to ON while being turned to an open state when switched to OFF. This signal is configured with two potentials of $V_H$ and $V_L$. The switch is turned ON when the potential is $V_H$, and it is turned OFF when the potential is $V_L$. The control section 31b is formed with a micro computer, a timer IC, or the like, for example. The switch SW1 is attached to the control section 31b, for example. The first display function layer 12 and the second display function layer 13 are connected in parallel to the erasing device 7b as in the case of the first exemplary embodiment.

Figure 12A:
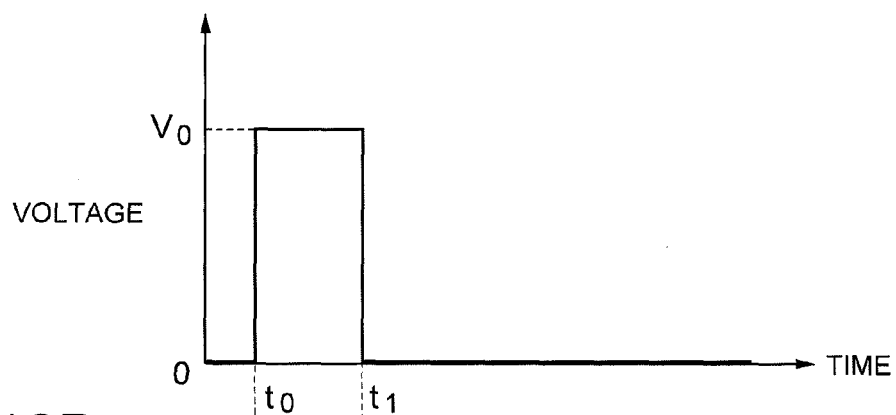
FIGS. 12A to 12C are graphs for describing timing chart in the voltage applied to a display function layer and a signal voltage outputted from a control section according to the second exemplary embodiment.
Figure 12B:
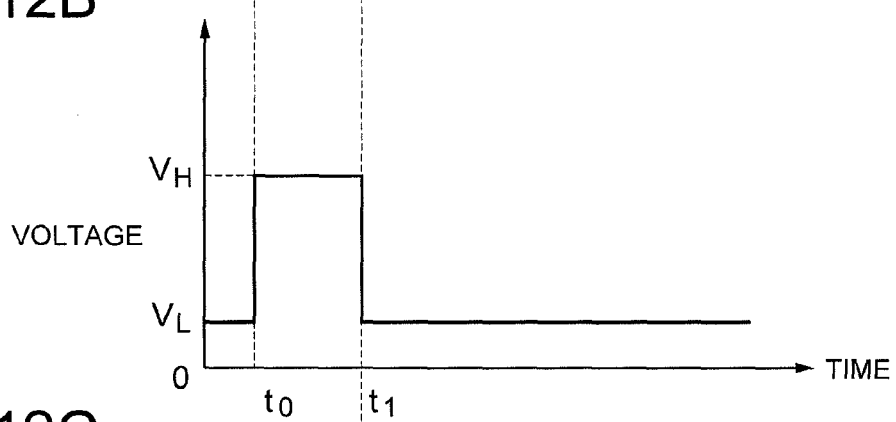
Figure 12C:
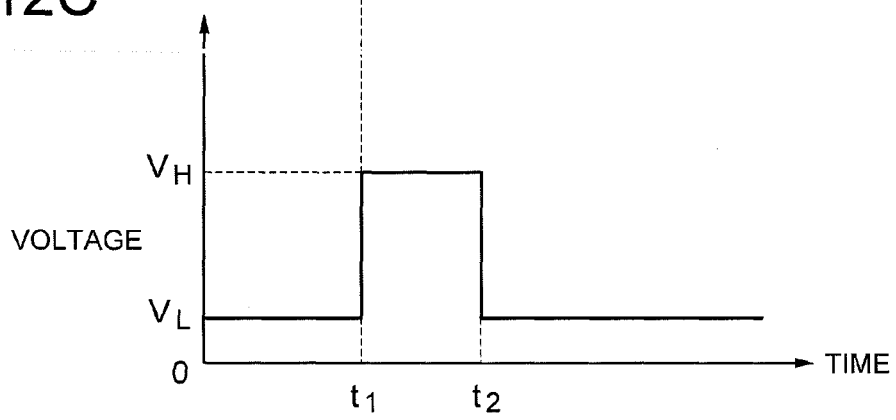
Figure 13B:
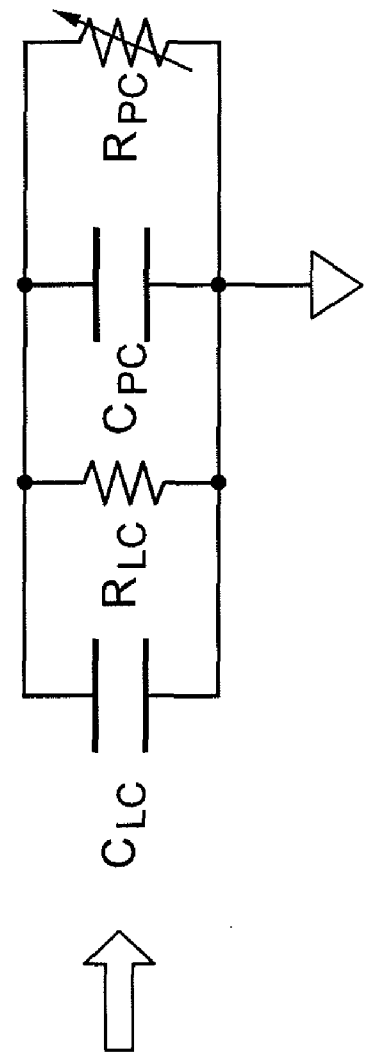
FIG. 13B is an illustration showing an equivalent circuit when the display function layer according to the second exemplary embodiment is connected to a discharging section.
Figure 13A:
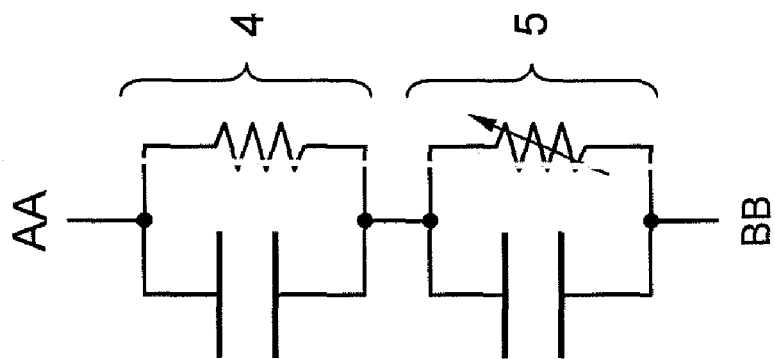
FIG. 13A is an illustration showing an equivalent circuit of the display function layer according to the second exemplary embodiment.

FIGS. 12A-12C show timing chart regarding the voltage applied to the first display function layer 12 and the second display function layer 13 (FIG. 12A), the signal applied to the switch SW1 from the control section 31b (FIG. 12B), and the signal applied to the switch SW2 from the control section 31b (FIG. 12C). Hereinafter, driving of the erasing device according to the second exemplary embodiment will be described by referring to FIGS. 12A-12C.

The direct-current erasing signal required for the reset operation is generated by the booster circuit 33b within the erasing device 7b. First, the potential of the signal inputted to the switch SW1 from the control section 31b is turned to $V_H$ at time $t_0$, and the erasing signal is applied to the first display function layer 12 and the second display function layer 13 from the signal generating section 8b. After a period (about 20 ms) required for the cholesteric liquid crystal layer to change to the homeotropic alignment has passed, the potential of the signal inputted to the switch SW1 is turned to $V_L$ at time $t_1$, and impression of the erasing signal is ended. Further, the potential of the signal inputted to the switch SW2 is turned to $V_H$ at time $t_1$ and the discharging section 30b becomes electrically connected. Thereby, elimination of the residual voltages in the cholesteric liquid crystal layers (the G layer 16, the B layer 17, and the R layer 20) and the photoconductive layers 18, 21 within the first display function layer 12 and the second display function layer 13 is started. At last, the potential of the signal inputted to the switch SW2 is turned to $V_L$ at time $t_2$, and the discharging section 30b is turned to an open state.

Hereinafter, the residual voltage generated in the display function layer will be described. FIG. 13A shows an equivalent circuit of the first display function layer 12 and the second display function layer 13. A cholesteric layer 4 corresponds to the G layer 16 and the B layer 17 of the first display function layer 12, and corresponds to the R layer 20 of the second display function layer 13. The cholesteric liquid crystal layer 4 is expressed in a parallel connection of a capacitance and a resistance. Similarly, a photoconductive layer 5 is also expressed in a parallel connection of a capacitance and a resistance. The cholesteric liquid crystal layer 4 and the photoconductive layer 5 are connected in series. Note here that the light shielding layers 19 and 22 are thinner in the film thickness compared to the cholesteric liquid crystal layer 4 and the conductive layer 5, so that those can be ignored on the equivalent circuits. In the case of such equivalent circuit, the charging/discharging time constant τ of the display function layers can be expressed by a following expression.

[Numerical Expression 17]

$$\tau = \frac{R_{LC} R_{PC}}{R_{LC} + R_{PC}} (C_{LC} + C_{PC}) \quad (15)$$

$C_{LC}$ and $C_{PC}$ show the capacitances of the cholesteric liquid crystal layer 4 and the photoconductive layer 5, respectively, and $R_{LC}$ and $R_{PC}$ show the resistances of the cholesteric liquid crystal layer 4 and the photoconductive layer 5, respectively. The resistivity of the cholesteric liquid crystal layer 4 is about $1.0 \times 10^{12}$ Ω·cm, and the resistivity of the photoconductive layer 5 at the time of non-exposure, i.e., at the time of erasing action, is about $1.0 \times 10^{13}$ Ω·cm. Thus, provided that the capacitance of the cholesteric liquid crystal layer 4 and that of the photoconductive layer 5 are almost the same, the charging/discharging time constant is several hundreds ms. When AA point and BB point of FIG. 13A becomes electrically connected after applying the erasing signal, the residual voltage is discharged in several hundreds ms However, when AA point and BB point becomes in an open state after applying the erasing signal, the residual voltage is discharged individually in each layer. That is, in the cholesteric liquid crystal layer 4 with relatively small resistivity, the residual voltage is discharged in the charging/discharging time constant expressed by $R_{LC} \cdot C_{LC}$, i.e., several hundreds ms. In the meantime, in the photoconductive layer 5 with relatively large resistivity, the residual voltage is discharged in the charging/discharging time constant expressed by $R_{PC} \cdot C_{PC}$, i.e., several ms. When the time of discharge is extended, deviation of ionic impurity within the photoconductive layer 5 becomes increased, so that deterioration in the property of the photoconductive layer 5 is increased. Further, when the residual voltage exists for a long time, there is a possibility of generating inconveniences when it comes in contact with the electrodes of the display medium 11.

When the switch SW2 is turned ON and the discharging section 30b is electrically connected, the equivalent circuit of the first display function layer 12 and the second display function layer 13 comes to be in a state shown in FIG. 13B. The synthesized resistance of the resistance components becomes $R_{LC} \cdot R_{PC} / (R_{LC} + R_{PC})$. $R_{PC}$ is larger than $R_{LC}$, so that the resistance component of this equivalent circuit can be approximated to $R_{LC}$. When not electrically connected to the discharging section 30b, the cholesteric liquid crystal layer 4 and the photoconductive layer 5 discharge the voltages individually. Thus, the residual voltage in the cholesteric liquid crystal layer 4 is discharged in the charging/discharging time constant determined by the resistance of $R_{LC}$, while the residual voltage in the photoconductive layer 5 is discharged in the charging/discharging time constant determined by the resistance of $R_{PC}$. However, in the case of the second exemplary embodiment, $R_{LC}$ is about 1/10 of $R_{PC}$. Thus, compared to the case where the discharging section 30b is not connected, the residual voltage in the photoconductive layer 5 is discharged in the charging/discharging time constant of about 1/10. Therefore, the residual voltage of the photoconductive layer 5 is eliminated faster.

With the second exemplary embodiment, the residual voltage of the display function layer can be eliminated. Therefore, it is possible to achieve the erasing device of improved reliability and safety, which is capable of preventing deterioration of the display function layer and preventing electric shock caused by the residual voltage.

(Third Exemplary Embodiment)

Figure 14:
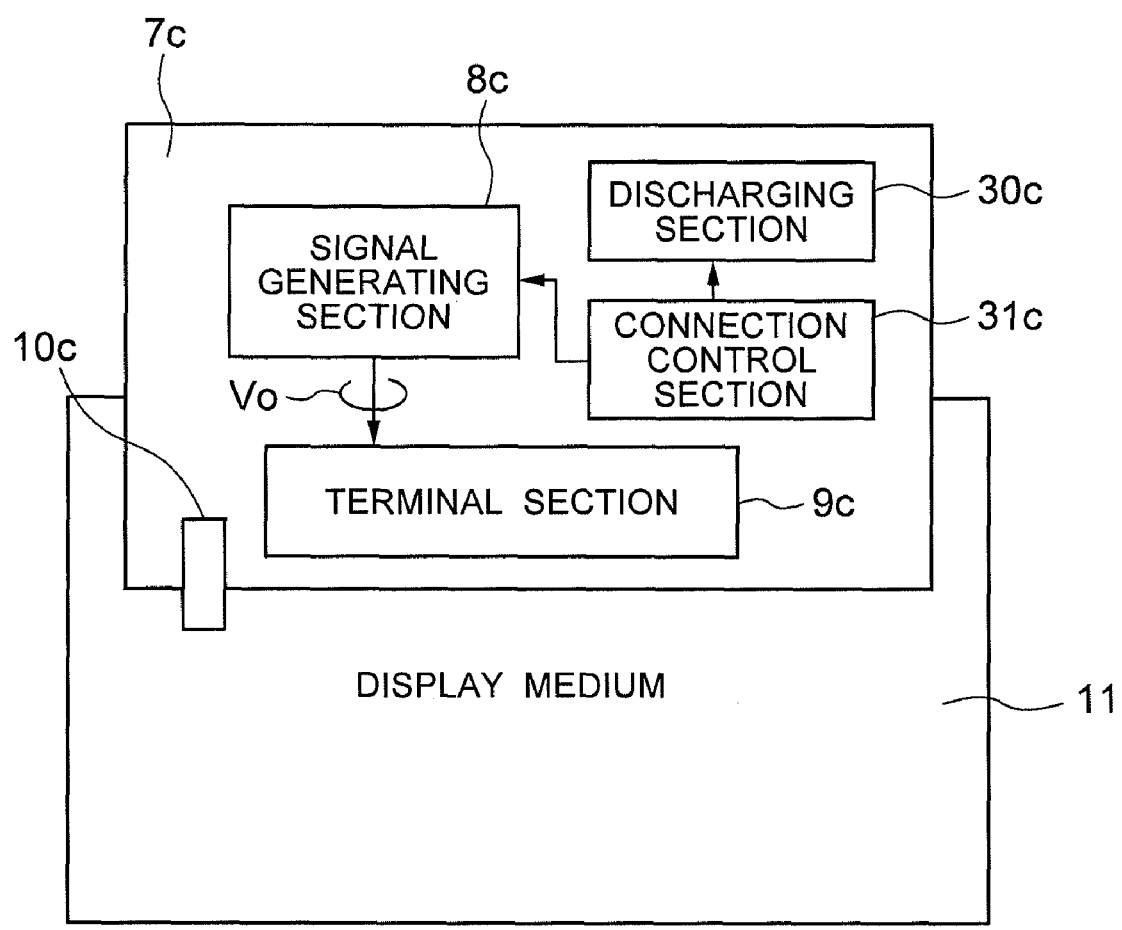
FIG. 14 is a conceptual illustration showing the structure of an erasing device according to a third exemplary embodiment.
Figure 15:
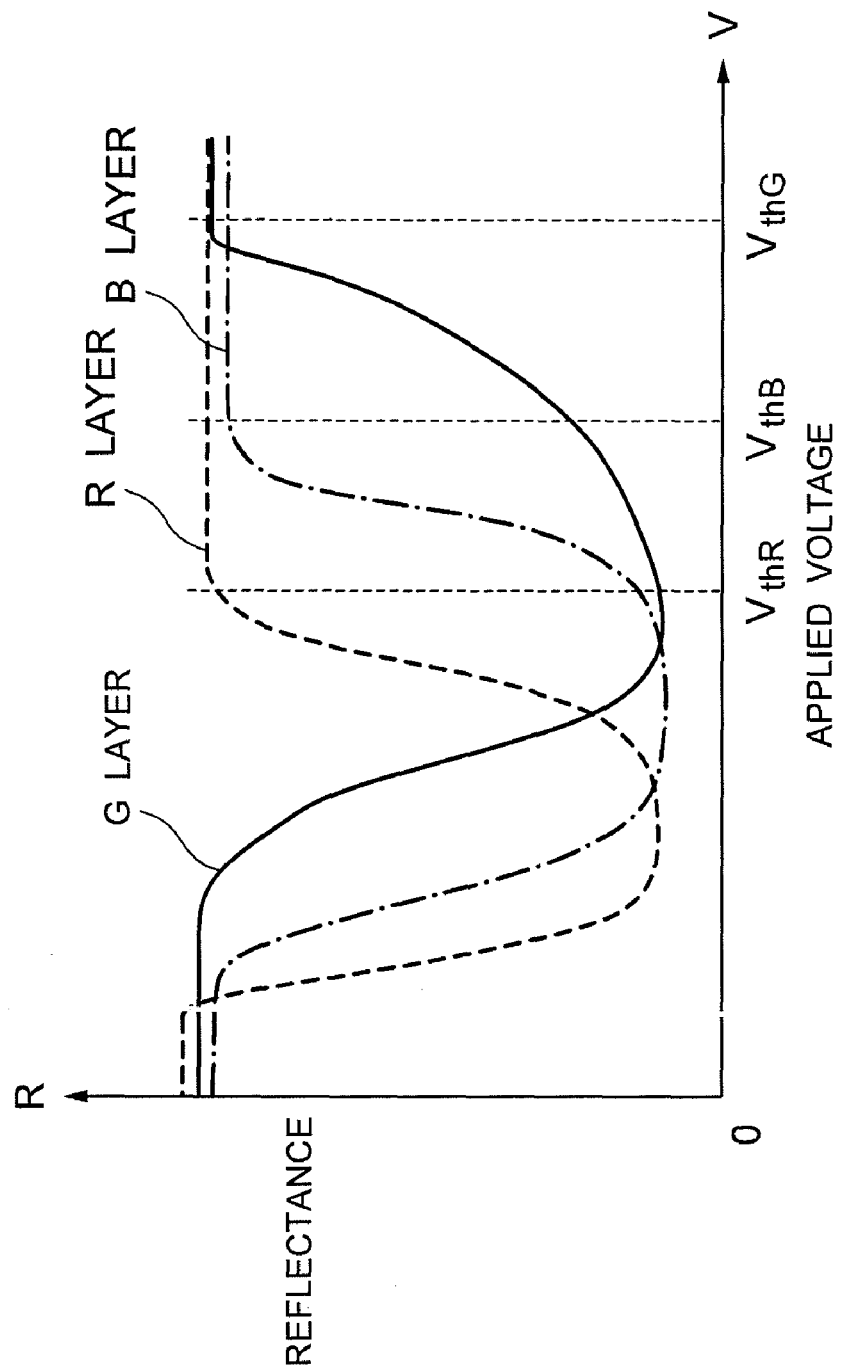
FIG. 15 is a graph for describing the behaviors of changes in the alignment of the cholesteric liquid crystal that configures the display medium according to the third exemplary embodiment.
Figure 16:
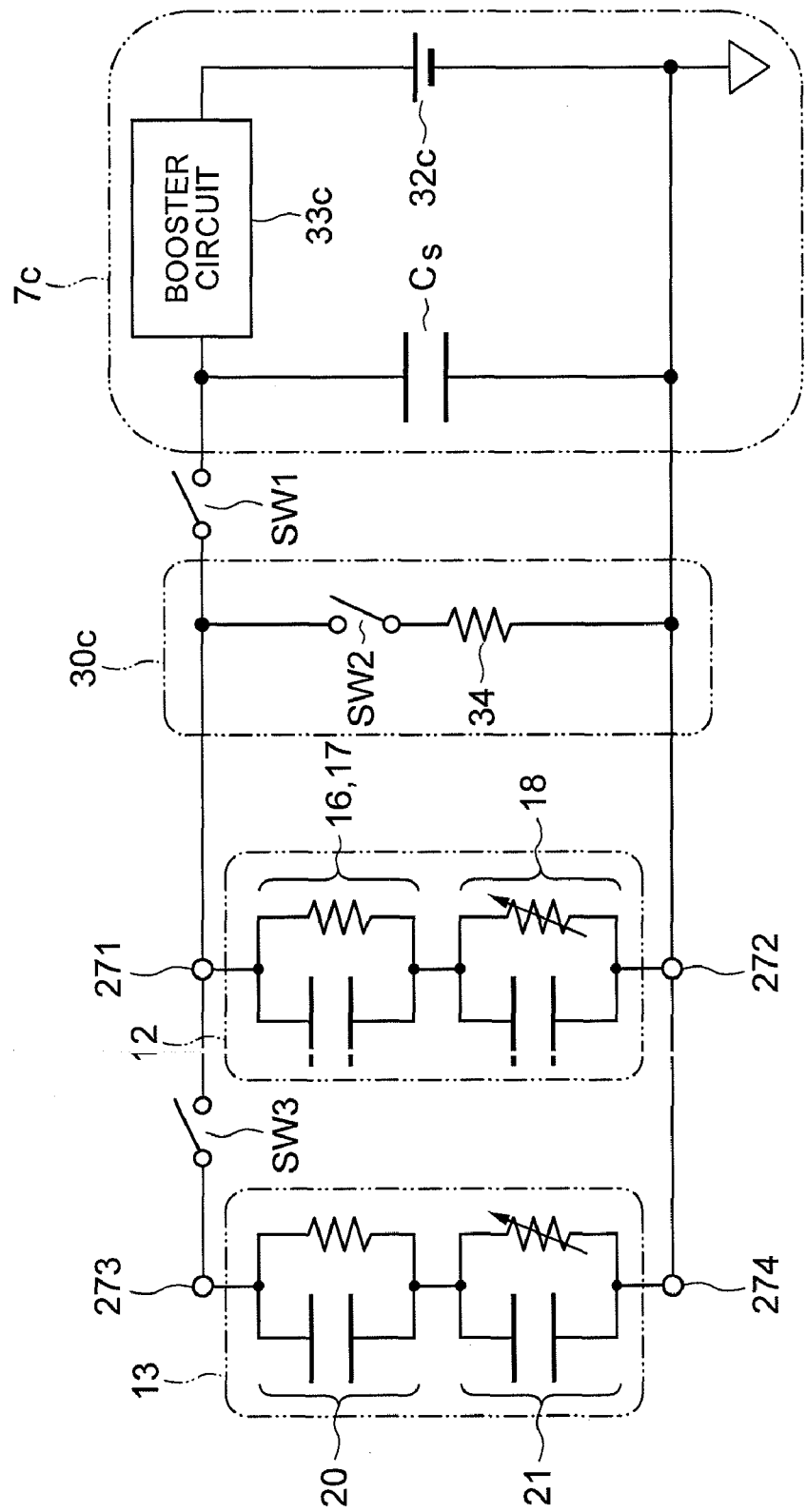
FIG. 16 is an illustration showing an equivalent circuit of a case where the erasing device and the display medium according to the third exemplary embodiment are connected.

FIG. 14 is a conceptual illustration showing the structure of an erasing device according to a third exemplary embodiment. FIG. 15 is an illustration for describing the behaviors of changes in the alignment of the cholesteric liquid crystal that configures the display medium according to the third exemplary embodiment. FIG. 16 is an illustration showing an equivalent circuit of a case where the erasing device and the display medium according to the third exemplary embodiment are connected. FIG. 17 is a graph for describing timing chart in the voltage applied to a display function layer and a signal voltage outputted from a connection control section according to the third exemplary embodiment. Hereinafter, the third exemplary embodiment will be described by referring to FIG. 14-FIG. 17. The display medium of the third exemplary embodiment is the same as the display medium of the first exemplary embodiment, so that FIG. 2 and FIG. 8 will be used for that.

The display medium 11 of the third exemplary embodiment includes the first display function layer 12 and the second display function layer 13. An erasing device 7c according to the third exemplary embodiment is characterized to further include a connection control section 31c which applies the voltage remained in the first display function layer 12 after the erasing voltage outputted from a signal generating section 8c is applied to the first display function layer 12.

As shown in FIG. 14, the erasing device 7c includes the signal generating section 8c, a terminal section 9c, a fitting section 10c, a discharging section 30c, and the connection control section 31c. The functions of the terminal section 9c and the fitting section 10c, and the connecting method of the erasing device 7b and the display medium 11 are the same as those of the first exemplary embodiment.

The layer structure of the display medium 11 of the third exemplary embodiment is the same as that of the first exemplary embodiment. However, the behaviors regarding the changes in the alignment of the R layer 20 of the second display function 13 are slightly different. FIG. 15 shows the behaviors of the changes in the alignments of the G layer 16, the B layer 17, and the R layer 20. The threshold voltage $V_{thR}$ of the R layer 20 is about 1/2 of the threshold voltage $V_{thG}$ of the G layer 16. The voltage of the direct-current erasing signal generated by the signal generating section 8c is set in the manner as described in the first exemplary embodiment. By applying the erasing signal, the voltage of equal to or larger than the threshold voltage is applied to the G layer 16 and the B layer 17 of the first display function layer 12.

FIG. 16 shows an equivalent circuit where the erasing device and the display medium according to the third exemplary embodiment are connected. The signal generating section 8c includes a power supply 32c such as a dry battery, a booster circuit 33c, a smoothing capacitor $C_S$ and the like. Further, a switch SW1 is provided between the signal generating section 8c and the discharging section (i.e., the discharging circuit) 30c, and a switch SW2 is provided within the discharging section 30c. Further, a switch SW3 is provided between a wiring lead from the signal generating section 8c to the first display function layer 12 and a wiring led from the first display function layer 12 to the second display function layer 13. The functions and operation methods of the discharging section 30c and the switches SW1, SW2, SW3 are the same as those of the second exemplary embodiment. The first display function layer 12 and the second display function layer 13 are connected in parallel to the erasing device 7c via the switch SW3. The control section 31c is formed with a micro computer, a timer IC, or the like, for example. The switches SW1 and SW3 are attached to the connection control section 31c, for example. When the display medium is formed with two display function layers, the electric current flown in the entire display medium is increased compared to the case of single display function layer. Thus, the power consumption of the erasing device is increased as well. Therefore, the increase in the power consumption can be suppressed by limiting the impression of the erasing signal from the signal generating section only to one display function layer. Further, as described above, the residual voltage is generated in the display function layers in the case where the erasing signal is the direct-current signal. However, it is possible to distribute the residual voltage to one of the display function layers, and apply the voltage to the cholesteric liquid crystal layer of the other display function layer.

Figure 17A:
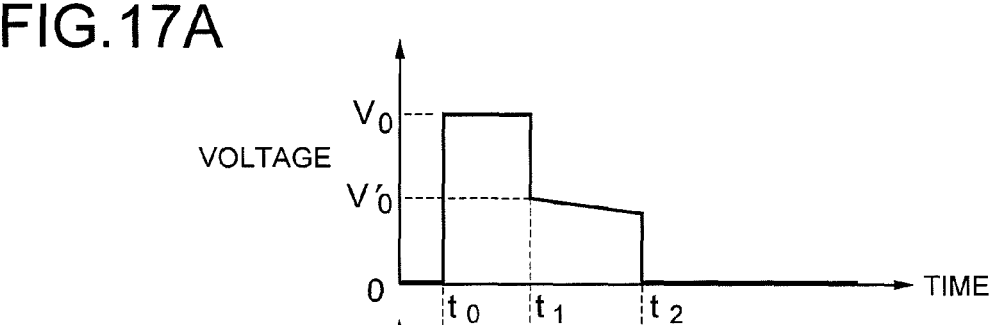
FIG. 17A to 17E are graphs for describing timing chart in the voltage applied to a display function layer and a signal voltage outputted from a connection control section according to the third exemplary embodiment.
Figure 17B:
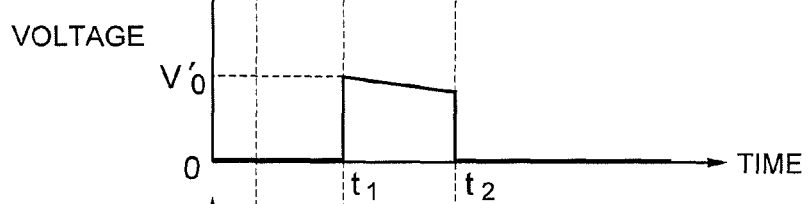
Figure 17C:
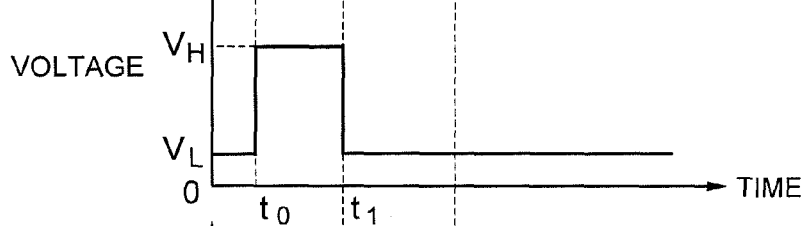
Figure 17D:
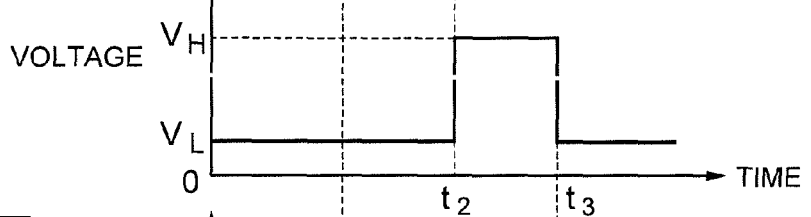
Figure 17E:
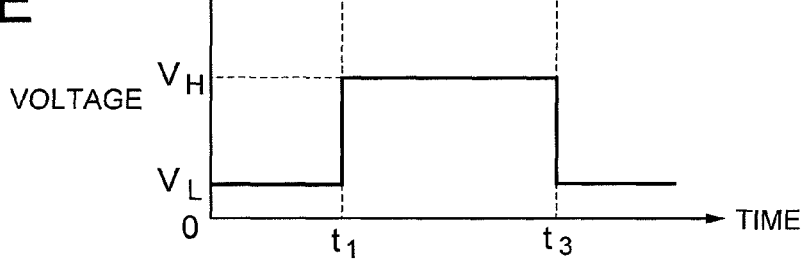

Distributions of the residual voltage will be described. FIGS. 17A-17E show timing chart regarding the voltage applied to the first display function layer 12 (FIG. 17A), the voltage applied to the second display function layer 13 (FIG. 17B), the signal applied to the switch SW1 from the connection control section 31c (FIG. 17C), the signal applied to the switch SW2 from the connection control section 31c (FIG. 17D), and the signal applied to the switch SW3 from the connection control section 31c (FIG. 17E). Hereinafter, driving of the erasing device 7c according to the third exemplary embodiment will be described by referring to FIGS. 17A-17E. The direct-current erasing signal required for the reset operation is generated by the booster circuit 33c within the signal generating section 8c. First, the potential of the signal inputted to the switch SW1 from the connection control section 31c is turned to $V_H$ at time $t_0$, and the erasing signal is applied to the first display function layer 12 from the signal generating section 8c. After a period (about 20 ms) for the cholesteric liquid crystal layer to change to the homeotropic alignment has passed, the potential of the signal inputted to the switch SW1 is turned to $V_L$ at time $t_1$, and impression of the erasing signal is ended. Further, the potential of the signal inputted to the switch SW3 is turned to $V_H$ at time $t_1$, and the first display function layer 12 and the second display function layer 13 are connected in parallel. At this time, the residual voltage of the first display function layer 12 is distributed, so that the voltage applied to the first display function layer 12 changes from $V_0$ to $V_0'$ and the voltage applied to the second display function layer 13 changes from 0 to $V_0'$. After the period for the cholesteric liquid crystal layer to change to the homeotropic alignment has passed, the potential of the signal inputted to the switch SW2 is turned to $V_H$ at time $t_2$, and the discharging section 30c is electrically connected. Thereby, elimination of the residual voltages in the cholesteric liquid crystal layers (the G layer 16, the B layer 17, and the R layer 20) and the photoconductive layers 18, 21 within the first display function layer 12 and the second display function layer 13 is started. At last, the potential of the signal inputted to the switches SW2 and SW3 is turned to $V_L$ at time $t_3$, and the discharging section 30c is turned to an open state. Thus, the connection between the first display function layer 12 and the second display function layer 13 is released.

When the switch SW3 is turned ON and the first display function layer 12 is connected to the second display function layer 13, the residual voltage of the first display function layer 12 is distributed to the second display function layer 13 and the voltage is applied to the cholesteric liquid crystal layer (the R layer 20) of the second display function layer 13. The voltages after distribution are determined according to the residual voltage, the entire capacitance of the first display function layer 12, and the entire capacitance of the second display function layer 13. The voltage $V_P$ after distribution is expressed by a following expression, provided that the residual voltage is $V_R$, the entire capacitance of the first display function layer 12 is $C_1$, and the entire capacitance of the second display function layer 13 is $C_2$.

[Numerical Expression 18]

$$V_P = \frac{C_1}{C_1 + C_2} V_R \quad (16)$$

The entire capacitances of the first display function layer 12 and the second display function layer 13 are almost the same, so that the voltage $V_P$ after distribution becomes a half the residual voltage $V_R$. The switch SW3 is turned ON immediately after the switch SW1 is turned OFF, so that the residual voltage $V_R$ of the first display function layer 12 to be distributed becomes the voltage $V_1$ to be applied to the first display function layer 12. That is, the voltage $V_P$ after distribution is expressed as in a following expression by using the expression (4).

[Numerical Expression 19]

$$V_P = \frac{1}{2} V_R = \frac{1}{2} V_{LCG} = \frac{2R_{LC} + R_{PC}}{2R_{LC}} V_{thG} \quad (17)$$

The voltage applied to the cholesteric liquid crystal layer (the R layer 20) of the second display function layer 13 changes to the resistance divided voltage from the capacitance divided voltage in about several hundreds ms. Therefore, it is considered that the capacitance divided voltage is applied to the cholesteric liquid crystal layer in the period (about 20 ms) for the cholesteric liquid crystal layer to change to the homeotropic alignment. The capacitance of the cholesteric liquid crystal layer and the capacitance of the photoconductive layer 21 are almost the same, so that the voltage of a half of $V_P$ is applied to the cholesteric liquid crystal layer. Thus, the voltage $V_{LCR}$ applied to the R layer 20 of the second display function layer 13 is expressed as in a following expression.

[Numerical Expression 20]

$$V_{LCR} = \frac{1}{2}V_P = \frac{2R_{LC} + R_{PC}}{4R_{LC}}V_{thG} = \left(\frac{1}{2} + \frac{R_{PC}}{4R_{LC}}\right)V_{thG} > \frac{1}{2}V_{thG} \quad (18)$$

From the expression (18), the voltage applied to the R layer 20 becomes larger than ½ of the threshold voltage of the G layer 16. Thus, the threshold voltage of the R layer 20 is about ½ of the threshold voltage of the G layer 16, so that the voltage applied to the R layer 20 becomes larger than the threshold voltage of the R layer 20. Therefore, it is possible to perform erasure of the R layer 20 with the distributed residual voltage.

The switch SW3 is turned OFF after the period where the R layer 20 changes to the homeotropic alignment. Thereby, impression of the voltage to the second display function layer 13 is ended. Thereafter, the switch SW2 is turned ON, so that the discharging section 30c becomes electrically connected and the residual voltage is eliminated. This makes it possible to suppress deterioration of the photoconductive layers 18, 21 and to prevent electric shock caused when touching the electrodes of the display medium 11.

As described above, when the erasing signal from the signal generating section 8c is applied in the third exemplary embodiment, only the first display function layer 12 is connected to the signal generating section 8c. Therefore, it is possible to reduce the electric current flown in the erasing device 7c at the time of applying the erasing signal compared to the case where the erasing signal is applied simultaneously to the first display function layer 12 and the second display function layer 13 simultaneously as in the case of the second exemplary embodiment. Further, the residual voltage of the first display function layer 12 is applied to the second display function layer 13, so that it is possible to achieve the erasing device 7c of low power consumption.

(Others)

The structure of the present invention can also be expressed as follows.

The issues described above can be overcome with the erasing device of the present invention. That is, the first erasing device of the present invention includes: a fitting section for being loaded to an optical writing type display medium configured with a display function layer including a pair of electrodes and at least a cholesteric liquid crystal layer and a photoconductive layer provided between the electrodes; a terminal section that connects to the electrodes of the display medium; and a signal generating section which generates an erasing signal inputted to the display medium for erasing an image pattern recorded on the display medium. Provided that the number of the cholesteric liquid crystal layers included in the display function layer having the maximum number of the cholesteric liquid crystal layers among the display function layers configuring the display medium is n, the resistance of the cholesteric liquid crystal layer is $R_{LC}$, the resistance of the photoconductive layer is $R_{PC}$, and the maximum threshold voltage among the threshold voltages with which the entire region of the cholesteric liquid crystal layer changes to the homeotropic alignment is $V_{thmax}$, the potential difference $V_0$ supplied between the electrodes by the erasing signal satisfies the expression (1).

Provided that the capacitance of the cholesteric liquid crystal layer is $C_{LC}$, the capacitance of the photoconductive layer is $C_{PC}$, the charging/discharging time constant is $\tau$, the time required for the cholesteric liquid crystal layer to change to the homeotropic alignment is $t_H$, it is desirable for the potential difference $V_0$ supplied between the electrodes by the erasing signal to satisfy the expression (2). Further, the erasing signal is desirable to be a direct-current signal.

With the second erasing device of the present invention, the erasing signal is the direct-current signal. The second erasing device is characterized to include a discharging section which eliminates the residual voltage of the display function layer after input of the direct-current signal is ended.

The third erasing device of the present invention is an erasing device of an image pattern recorded on a display medium, which includes a fitting section for being loaded to an optical writing type display medium configured with a plurality of the display function layers, and a terminal section that connects to the electrodes of the display medium. A part of the display function layers of the display medium and the signal generating section are electrically isolated after applying the erasing signal, and the erasing device is provided with a connection control section having a function of distributing the residual voltage of a part of the display function layer described above to the display function layer that is different from a part of the display function layer described above.

The effects of the present invention can also be expressed as follows.

With the first erasing device of the present invention, the voltage of equal to or larger than the threshold voltage with which the entire region of the cholesteric liquid crystal layers within the display function layers configuring the optical writing type display medium, i.e., both the planar alignment part and the focal conic alignment pattern of an image pattern, change to the homeotropic alignment is applied. Thus, it is possible to achieve the erasing device that is capable erasing the image pattern securely by suppressing the afterimage of the image pattern through conducting the reset operation. Further, the amplitude of the erasing signal is set according to the resistance values as well as the capacitance values of the cholesteric liquid crystal layers within the display function layer, the resistance value as well as the capacitance value of the photoconductive layer, and the threshold voltage of the cholesteric liquid crystal layer, and the minimum voltage required for the erasing operation of the display medium can be applied to the cholesteric liquid crystal layer. Thus, it is possible to achieve the erasing device of suppressed power consumption. Further, in the case where the erasing signal is a direct-current signal, it is possible to achieve lower power consumption than the case of an alternating-current signal.

With the second erasing device of the present invention, the voltage remained in the display function layer, particularly in the photoconductive layer, in the case where the erasing signal is the direct-current signal is immediately discharged by the discharging section provided to the erasing device, so that there is no deviation of the ionic impurity within the photoconductive layer. Thus, it is possible to achieve the erasing device which can suppress deterioration of the photoconductive layer and to secure the reliability of the display function layer. Further, electric shock generated when touching the electrodes of the display medium can be prevented, so that the safety can be improved as well.

With the third erasing device of the present invention, the connection control section controls to apply the erasing signal to a part of the display function layers from the signal generating section, a part of the display function layers described above and the signal generating section are electrically isolated after applying the erasing signal, and a part of the display function layers described above is then electrically connected to another display function layer. Thus, the erasing signal is not applied to all the display function layers of the display medium simultaneously, so that the increase in the electric current flown in the entire display function layers can be suppressed. The residual voltage of a part of the display function layers to which the erasing signal is applied from the signal generating section is applied to the cholesteric liquid crystal layer of the display function layer to which the erasing signal is not directly applied from the signal generating section, and the reset operation can be conducted thereby. Thus, in a case where the display medium is configured with a plurality of display function layers, the erasing device can suppress the power consumption.

The structure of the present invention can also be expressed as follows.

[1] An erasing device that includes: a fitting section for being loaded to an optical writing type display medium configured with a display function layer including a pair of electrodes and at least a cholesteric liquid crystal layer and a photoconductive layer provided between the electrodes; a terminal section that connects to the electrodes of the display medium; and a signal generating section which generates an erasing signal for erasing an image pattern recorded on the display medium, wherein a potential difference supplied between the electrodes by the erasing signal satisfies the expression (1).

In the expression (1), $V_0$: the potential difference supplied between the electrodes, n: the number of the cholesteric liquid crystal layers included in the display function layer having the maximum number of the cholesteric liquid crystal layers, $R_{LC}$: the resistance of the cholesteric liquid crystal layer, $R_{PC}$: the resistance of the photoconductive layer, and $V_{thmax}$: the maximum threshold voltage among the threshold voltages with which the cholesteric liquid crystal layer changes to the homeotropic alignment.

[2] An erasing device that includes: a fitting section for being loaded to an optical writing type display medium configured with a display function layer including a pair of electrodes and at least a cholesteric liquid crystal layer and a photoconductive layer provided between the electrodes; a terminal section that connects to the electrodes of the display medium; and a signal generating section which generates an erasing signal for erasing an image pattern recorded on the display medium, wherein a potential difference supplied between the electrodes by the erasing signal satisfies the expression (2).

In the expression (2), $V_0$: the potential difference supplied between the electrodes, n: the number of the cholesteric liquid crystal layers included in the display function layer having the maximum number of the cholesteric liquid crystal layers, $R_{LC}$: the resistance of the cholesteric liquid crystal layer, $R_{PC}$: the resistance of the photoconductive layer, $C_{LC}$: the capacitance of the cholesteric liquid crystal layer, $C_{PC}$: the capacitance of the photoconductive layer, $V_{thmax}$: the maximum threshold voltage among the threshold voltages with which the cholesteric liquid crystal layer changes to the homeotropic alignment, $t_H$: the period required for changing to the homeotropic alignment, and τ: the charging/discharging time constant of the display function layer.

[3] The erasing device depicted in [1] or [2], in which the erasing signal is a direct-current signal.

[4] The erasing device depicted in [3], which includes a discharging section that eliminates the residual voltage of the display function layer after input of the erasing signal is completed.

[5] The erasing device depicted in [4] for erasing an image pattern recorded on a display medium, which includes a fitting section for being loaded to an optical writing type display medium configured with a plurality of the display function layers and a terminal section that connects to the electrodes of the display medium, wherein a part of the display function layers of the display medium and the signal generating section are electrically isolated after applying the erasing signal, and the erasing device is provided with a connection control section having a function of distributing the residual voltage of a part of the display function layer described above to the display function layer that is different from a part of the display function layer described above.

[6] The erasing device depicted in [1] or [2], which does not require external light when erasing an image pattern.

While the present invention has been described above by referring to each of the above exemplary embodiments, the present invention is not limited to each of those exemplary embodiments. Various changes and modifications that occur to those skilled in the art can be applied to the structures and details of the present invention. It is to be noted that those acquired by mutually combining a part of or the entire part of the structures of each of the above-described exemplary embodiments as appropriate are included as the present invention. A part of or the entire part of the exemplary embodiments can also be depicted as in following Supplementary Notes. However, it is to be noted that the present invention is not limited to the following structures.

(Supplementary Note 1) An erasing device used for erasing an image pattern recorded on an optical writing type display medium that includes a display function layer in a structure in which a laminate including a photoconductive layer and n-layers (n is a natural number) of cholesteric liquid crystal layers is sandwiched between a pair of electrodes. The erasing device includes a signal generating section that applies an erasing voltage for erasing the image pattern to the pair of electrodes, wherein in a state where Vm is determined according to only each resistance of the n-layers of the cholesteric liquid crystal layers and resistance of the photoconductive layer, the erasing voltage is set to satisfy Vm≧Vthm in all cases where m is an integer of 1 to n, provided that m takes any integers from 1 to n, a voltage applied to the m-th layer of the cholesteric liquid crystal layer when the erasing voltage is applied between the pair of electrodes is Vm, and a threshold voltage with which the m-th layer of the cholesteric liquid crystal layer changes to an homeotropic alignment is Vthm.

(Supplementary Note 2) The erasing device depicted in Supplementary Note 1, wherein the erasing voltage is further set to satisfy the above-described expression (1), provided that the erasing voltage is $V_0$, each resistance of the cholesteric liquid crystal layers is $R_{LC}$, the resistance of the photoconductive layer is $R_{PC}$, the maximum value out of the n-pieces of the threshold voltages is $V_{thmax}$.

(Supplementary Note 3) The erasing device depicted in Supplementary Note 2, wherein in a state where Vm is determined according to only each static capacitance of the n-layers of the cholesteric liquid crystal layers and static capacitance of the photoconductive layer immediately after the erasing voltage is applied to the pair of electrodes, and thereafter becomes close to a value that is determined according to only each resistance of the n-layers of the cholesteric liquid crystal layers and resistance of the photoconductive layer, the erasing voltage is further set to satisfy Vm≧Vthm in all time of a period from a point at which the erasing voltage is applied to a point at which the m-th layer of the cholesteric liquid crystal layer changes to the homeotropic alignment and in all cases where m is an integer of 1 to n.

(Supplementary Note 4) The erasing device depicted in Supplementary Note 3, wherein
the erasing voltage is further set to satisfy the above-described expression (2), provided that the erasing voltage is $V_0$, each resistance of the cholesteric liquid crystal layers is $R_{LC}$, the resistance of the photoconductive layer is $R_{PC}$, each static capacitance of the cholesteric liquid crystal layers is $C_{LC}$, the static capacitance of the photoconductive layer is $C_{PC}$, the maximum value out of the n-pieces of the threshold voltages is $V_{thmax}$, time required for changing to the homeotropic alignment is $t_H$, and a charging/discharging time constant of the display function layer is $\tau$.

(Supplementary Note 5) The erasing device depicted in Supplementary Note 4, wherein the n is an integer of 2 or larger.

(Supplementary Note 6) The erasing device depicted in Supplementary Note 5, wherein the erasing voltage $V_0$ is equal to a right side of the expression (2).

(Supplementary Note 7) The erasing device as depicted in Supplementary Note 6, wherein the erasing voltage is a direct-current voltage.

(Supplementary Note 8) The erasing device depicted in Supplementary Note 7, wherein the display medium includes a plurality of the display function layers, and the erasing device further includes a connection control section that applies a voltage remained in a part of the display function layers to another display function layer, after the erasing voltage outputted from the signal generating section is applied to the part of the display function layers.

(Supplementary Note 9) The erasing device depicted in Supplementary Note 8, which further includes a discharging section that eliminates the voltage remained in the display function layer after the erasing voltage is applied.

(Supplementary Note 10) The erasing device depicted in Supplementary Note 1, wherein:
the display medium includes a plurality of the display function layers; and
the erasing voltage is further set to satisfy the above-described expression (1), provided that the erasing voltage is $V_0$, each resistance of the cholesteric liquid crystal layers is $R_{LC}$, the resistance of the photoconductive layer is $R_{PC}$, the maximum value out of the n-pieces of the threshold voltages of the n-layers of the display function layers as the maximum is $V_{thmax}$.

(Supplementary Note 11) The erasing device depicted in Supplementary Note 3, wherein:
the display medium includes a plurality of the display function layers; and
the erasing voltage is further set to satisfy the above-described expression (2), provided that the erasing voltage is $V_0$, each resistance of the cholesteric liquid crystal layers is $R_{LC}$, the resistance of the photoconductive layer is $R_{PC}$, each static capacitance of the cholesteric liquid crystal layers is $C_{LC}$, the static capacitance of the photoconductive layer is $C_{PC}$, the maximum value out of the n-pieces of the threshold voltages of the n-layers of the display function layers as the maximum is $V_{thmax}$, time required for changing to the homeotropic alignment is $t_H$, and a charging/discharging time constant of the display function layer is $\tau$.

(Supplementary Note 12) An optical writing type display medium that includes a display function layer in a structure in which a laminate including a photoconductive layer and n-layers (n is a natural number) of cholesteric liquid crystal layers is sandwiched between a pair of electrodes, the display medium being provided with the erasing device depicted in any one of Supplementary Notes 1-11.

Industrial Applicability

The erasing device and the like disclosed herein are used as an image pattern erasing module and the like of a display medium that can hold image patterns without a power supply, particularly an optical writing type display medium using the cholesteric liquid crystal layers.

What is claimed is:

1. An erasing device used for erasing an image pattern recorded on an optical writing type display medium that includes a display function layer in a structure in which a laminate including a photoconductive layer and n-layers (n is a natural number) of cholesteric liquid crystal layers is sandwiched between a pair of electrodes, the erasing device comprising
a signal generating section that applies an erasing voltage for erasing the image pattern to the pair of electrodes, wherein
in a state where Vm is determined according to each resistance of the n-layers of the cholesteric liquid crystal layers and resistance of the photoconductive layer, the erasing voltage is set to satisfy Vm≧Vthm in all cases where m is an integer of 1 to n, provided that m takes any integers from 1 to n, a voltage applied to the m-th layer of the cholesteric liquid crystal layer when the erasing voltage is applied between the pair of electrodes is Vm, and a threshold voltage with which the m-th layer of the cholesteric liquid crystal layer changes to an homeotropic alignment is Vthm.

2. The erasing device as claimed in claim 1, wherein
the erasing voltage is further set to satisfy a following expression (1), provided that the erasing voltage is $V_0$, each resistance of the cholesteric liquid crystal layers is $R_{LC}$, the resistance of the photoconductive layer is $R_{PC}$, the maximum value out of the n-pieces of the threshold voltages is $V_{thmax}$:

[Numerical Expression 1]

$$V_0 \geq \frac{nR_{LC} + R_{PC}}{R_{LC}} V_{thmax}. \quad (1)$$

3. The erasing device as claimed in claim 2, wherein
in a state where the Vm is determined according to each static capacitance of the n-layers of the cholesteric liquid crystal layers and static capacitance of the photoconductive layer immediately after the erasing voltage is applied to the pair of electrodes, and thereafter becomes close to a value that is determined according to each resistance of the n-layers of the cholesteric liquid crystal layers and resistance of the photoconductive layer,
the erasing voltage is further set to satisfy Vm≧Vthm in all time of a period from a point at which the erasing voltage is applied to a point at which the m-th layer of the cholesteric liquid crystal layer changes to the homeotropic alignment and in all cases where m is an integer of 1 to n.

4. The erasing device as claimed in claim 3, wherein
the erasing voltage is further set to satisfy a following expression (2), provided that the erasing voltage is $V_0$, each resistance of the cholesteric liquid crystal layers is $R_{LC}$, the resistance of the photoconductive layer is $R_{PC}$, each static capacitance of the cholesteric liquid crystal layers is $C_{LC}$, the static capacitance of the photoconductive layer is $C_{PC}$, the maximum value out of the n-pieces of the threshold voltages is $V_{thmax}$, time required for changing to the homeotropic alignment is $t_H$, and a charging/discharging time constant of the display function layer is:

[Numerical Expression 2]

$$V_0 \geq \frac{V_{thmax}}{\left(\frac{C_{PC}}{nC_{PC}+C_{LC}}-\frac{R_{LC}}{R_{PC}+nR_{LC}}\right)\exp\left(-\frac{t_H}{\tau}\right)+\frac{R_{LC}}{R_{PC}+nR_{LC}}}. \quad (2)$$

5. The erasing device as claimed in claim 4, wherein the n is an integer of 2 or larger.

6. The erasing device as claimed in claim 5, wherein the erasing voltage $V_0$ is equal to a right side of the expression (2).

7. The erasing device as claimed in claim 6, wherein the erasing voltage is a direct-current voltage.

8. The erasing device as claimed in claim 7, wherein the display medium includes a plurality of the display function layers,
the erasing device further comprising a connection control section that applies a voltage remained in a part of the display function layers to another display function layer, after the erasing voltage outputted from the signal generating section is applied to the part of the display function layers.

9. The erasing device as claimed in claim 8, further comprising a discharging section that eliminates the voltage remained in the display function layer after the erasing voltage is applied.

10. The erasing device as claimed in claim 3, wherein:
the display medium includes a plurality of the display function layers; and
the erasing voltage is further set to satisfy a following expression (2), provided that the erasing voltage is $V_0$, each resistance of the cholesteric liquid crystal layers is $R_{LC}$, the resistance of the photoconductive layer is $R_{PC}$, each static capacitance of the cholesteric liquid crystal layers is $C_{LC}$, the static capacitance of the photoconductive layer is $C_{PC}$, the maximum value out of the n-pieces of the threshold voltages of the n-layers of the display function layers as the maximum is $V_{thmax}$, time required for changing to the homeotropic alignment is $t_H$, and a charging/discharging time constant of the display function layer is:

[Numerical Expression 4]

$$V_0 \geq \frac{V_{thmax}}{\left(\frac{C_{PC}}{nC_{PC}+C_{LC}}-\frac{R_{LC}}{R_{PC}+nR_{LC}}\right)\exp\left(-\frac{t_H}{\tau}\right)+\frac{R_{LC}}{R_{PC}+nR_{LC}}}. \quad (2)$$

11. The erasing device as claimed in claim 1, wherein:
the display medium includes a plurality of the display function layers; and
the erasing voltage is further set to satisfy a following expression (1), provided that the erasing voltage is $V_0$, each resistance of the cholesteric liquid crystal layers is $R_{LC}$, the resistance of the photoconductive layer is $R_{PC}$, the maximum value out of the n-pieces of the threshold voltages of the n-layers of the display function layers as the maximum is $V_{thmax}$:

[Numerical Expression 3]

$$V_0 \geq \frac{nR_{LC}+R_{PC}}{R_{LC}}V_{thmax}. \quad (1)$$

12. An erasing method used for erasing an image pattern recorded on an optical writing type display medium that includes a display function layer in a structure in which a laminate including a photoconductive layer and n-layers (n is a natural number) of cholesteric liquid crystal layers is sandwiched between a pair of electrodes, the erasing method comprising:
in a state where Vm is determined according to each resistance of the n-layers of the cholesteric liquid crystal layers and resistance of the photoconductive layer, setting the erasing voltage to satisfy Vm≧Vthm in all cases where m is an integer of 1 to n, provided that m takes any integers from 1 to n, a voltage applied to the m-th layer of the cholesteric liquid crystal layer when the erasing voltage is applied between the pair of electrodes is Vm, and a threshold voltage with which the m-th layer of the cholesteric liquid crystal layer changes to an homeotropic alignment is Vthm; and
erasing the image pattern by applying the set erasing voltage between the pair of electrodes.

13. The erasing method as claimed in claim 12, wherein when setting the erasing voltage, the erasing voltage is set to satisfy a following expression (1), provided that the erasing voltage is $V_0$, each resistance of the cholesteric liquid crystal layers is $R_{LC}$, the resistance of the photoconductive layer is $R_{PC}$, the maximum value out of the n-pieces of the threshold voltages is $V_{thmax}$:

[Numerical Expression 5]

$$V_0 \geq \frac{nR_{LC}+R_{PC}}{R_{LC}}V_{thmax}. \quad (1)$$

14. The erasing method as claimed in claim 13, wherein when setting the erasing voltage, the erasing voltage is further set to satisfy Vm≧Vthm in all time of a period from a point at which the erasing voltage is applied to a point at which the m-th layer of the cholesteric liquid crystal layer changes to the homeotropic alignment and in all cases where m is an integer of 1 to n, in a state where the Vm is determined according to each static capacitance of the n-layers of the cholesteric liquid crystal layers and static capacitance of the photoconductive layer immediately after the erasing voltage is applied to the pair of electrodes, and thereafter becomes close to a value that is determined according to only each resistance of the n-layers of the cholesteric liquid crystal layers and resistance of the photoconductive layer.

15. The erasing method as claimed in claim 14, wherein when setting the erasing voltage, the erasing voltage is further set to satisfy a following expression (2), provided that the erasing voltage is $V_0$, each resistance of the cholesteric liquid crystal layers is $R_{LC}$, the resistance of the photoconductive layer is $R_{PC}$, each static capacitance of the cholesteric liquid crystal layers is $C_{LC}$, the static capacitance of the photoconductive layer is $C_{PC}$, the maximum value out of the n-pieces of the threshold voltages is $V_{thmax}$, time required for changing to the homeotropic alignment is $t_H$, and a charging/discharging time constant of the display function layer is:

[Numerical Expression 6]

$$V_0 \geq \frac{V_{thmax}}{\left(\frac{C_{PC}}{nC_{PC}+C_{LC}} - \frac{R_{LC}}{R_{PC}+nR_{LC}}\right)\exp\left(-\frac{t_H}{\tau}\right) + \frac{R_{LC}}{R_{PC}+nR_{LC}}}. \quad (2)$$

16. An erasing signal setting method for setting an erasing voltage applied between a pair of electrodes for erasing an image pattern recorded on an optical writing type display medium that includes a display function layer in a structure in which a laminate including a photoconductive layer and n-layers (n is a natural number) of cholesteric liquid crystal layers is sandwiched between the pair of electrodes, the erasing signal setting method comprising:

defining that m takes any integers from 1 to n, a voltage applied to the m-th layer of the cholesteric liquid crystal layer when the erasing voltage is applied between the pair of electrodes is Vm, and a threshold voltage with which the m-th layer of the cholesteric liquid crystal layer changes to an homeotropic alignment is Vthm; and in a state where Vm is determined according to each resistance of the n-layers of the cholesteric liquid crystal layers and resistance of the photoconductive layer, setting the erasing voltage to satisfy Vm≧Vthm in all cases where m is an integer of 1 to n.

17. The erasing signal setting method as claimed in claim 16, wherein when setting the erasing voltage, the erasing voltage is further set to satisfy a following expression (1), provided that the erasing voltage is $V_0$, each resistance of the cholesteric liquid crystal layers is $R_{LC}$, the resistance of the photoconductive layer is $R_{PC}$, and the maximum value out of the n-pieces of the threshold voltages is $V_{thmax}$:

[Numerical Expression 7]

$$V_0 \geq \frac{nR_{LC}+R_{PC}}{R_{LC}}V_{thmax}. \quad (1)$$

18. The erasing signal setting method as claimed in claim 17, wherein when setting the erasing voltage, the erasing voltage is further set to satisfy Vm≧Vthm in all time of a period from a point at which the erasing voltage is applied to a point at which the m-th layer of the cholesteric liquid crystal layer changes to the homeotropic alignment and in all cases where m is an integer of 1 to n, in a state where Vm is determined according to each static capacitance of the n-layers of the cholesteric liquid crystal layers and static capacitance of the photoconductive layer immediately after the erasing voltage is applied to the pair of electrodes, and thereafter becomes close to a value that is determined according to each resistance of the n-layers of the cholesteric liquid crystal layers and resistance of the photoconductive layer.

19. The erasing signal setting method as claimed in claim 18, wherein when setting the erasing voltage, the erasing voltage is further set to satisfy a following expression (2), provided that the erasing voltage is $V_0$, each resistance of the cholesteric liquid crystal layers is $R_{LC}$, the resistance of the photoconductive layer is $R_{PC}$, each static capacitance of the cholesteric liquid crystal layers is $C_{LC}$, the static capacitance of the photoconductive layer is $C_{PC}$, the maximum value out of the n-pieces of the threshold voltages is $V_{thmax}$, time required for changing to the homeotropic alignment is $t_H$, and a charging/discharging time constant of the display function layer is:

[Numerical Expression 8]

$$V_0 \geq \frac{V_{thmax}}{\left(\frac{C_{PC}}{nC_{PC}+C_{LC}} - \frac{R_{LC}}{R_{PC}+nR_{LC}}\right)\exp\left(-\frac{t_H}{\tau}\right) + \frac{R_{LC}}{R_{PC}+nR_{LC}}}. \quad (2)$$

20. An optical writing type display medium that includes a display function layer in a structure in which a laminate including a photoconductive layer and n-layers (n is a natural number) of cholesteric liquid crystal layers is sandwiched between a pair of electrodes, the display medium being provided with the erasing device of claim 1.

* * * * *